(12) United States Patent
Mao et al.

(10) Patent No.: US 10,985,614 B2
(45) Date of Patent: Apr. 20, 2021

(54) MODULAR AND EFFICIENT WIRELESS POWER TRANSFER SYSTEMS

(71) Applicants: Hengchun Mao, Allen, TX (US); Xuezhong Jia, Allen, TX (US)

(72) Inventors: Hengchun Mao, Allen, TX (US); Xuezhong Jia, Allen, TX (US)

( * ) Notice: Subject to any disclaimer, the term of this patent is extended or adjusted under 35 U.S.C. 154(b) by 168 days.

(21) Appl. No.: 16/131,469

(22) Filed: Sep. 14, 2018

(65) Prior Publication Data
US 2019/0089197 A1    Mar. 21, 2019

Related U.S. Application Data

(60) Provisional application No. 62/559,592, filed on Sep. 17, 2017.

(51) Int. Cl.
| | |
|---|---|
| *H02J 50/12* | (2016.01) |
| *H01F 38/14* | (2006.01) |
| *H02J 7/02* | (2016.01) |
| *H01F 27/38* | (2006.01) |
| *H02J 7/00* | (2006.01) |
| *H02M 3/337* | (2006.01) |
| *B60L 53/12* | (2019.01) |
| *H01F 3/14* | (2006.01) |
| *H01F 27/24* | (2006.01) |
| *H01F 27/36* | (2006.01) |
| *H02M 7/06* | (2006.01) |
| *H02M 7/5387* | (2007.01) |
| *H02M 1/00* | (2006.01) |

(52) U.S. Cl.
CPC .............. *H02J 50/12* (2016.02); *B60L 53/12* (2019.02); *H01F 3/14* (2013.01); *H01F 27/24* (2013.01); *H01F 27/36* (2013.01); *H01F 27/38* (2013.01); *H01F 38/14* (2013.01); *H02J 7/0045* (2013.01); *H02J 7/025* (2013.01); *H02M 3/337* (2013.01); *H02M 7/06* (2013.01); *H02M 7/5387* (2013.01); *H02M 2001/007* (2013.01); *H02M 2001/0058* (2013.01)

(58) Field of Classification Search
CPC .......... H01F 3/14; H01F 27/365; H01F 38/14; H02J 50/12; H02J 7/00712; H02J 7/025; H02M 7/5387; H02M 2001/007; H02M 3/337; B60L 53/12
See application file for complete search history.

(56) References Cited

U.S. PATENT DOCUMENTS

| | | | |
|---|---|---|---|
| 2014/0049990 A1* | 2/2014 | Limpaecher | H02M 3/33584 363/15 |
| 2014/0084703 A1* | 3/2014 | Hall | H02J 50/10 307/104 |
| 2014/0347010 A1* | 11/2014 | Tsai | H02J 7/025 320/108 |

* cited by examiner

*Primary Examiner* — Jared Fureman
*Assistant Examiner* — Duc M Pham

(57) ABSTRACT

A device has a plurality of coils arranged along a perimeter within the device, where each coil has a winding configured to be coupled to a power converter through a resonant capacitor, and forms a resonator with the resonant capacitor. The device has also a connection core which is magnetically coupled to the plurality of coils. Furthermore, the device has a plurality of power converters, where each power converter is coupled to one of the plurality of coils, and is configured such that a current flowing through the winding of the coil has the same frequency as other winding currents in the device, and the phase angle of the current is approximately equal to the space angle of the coil, so a rotating magnetic field is formed in a space around the device.

20 Claims, 27 Drawing Sheets

| Slot # | S1 | S2 | S3 | S4 | S5 | S6 | S7 | S8 | S9 | S10 | S11 | S12 |
|---|---|---|---|---|---|---|---|---|---|---|---|---|
| First Conductor | A+ | A+ | B+ | B+ | C+ | C+ | A- | A- | B- | B- | C- | C- |
| Second Conductor | C- | A+ | A+ | B+ | B+ | C+ | C+ | A- | A- | B- | B- | C- |

Figure 11

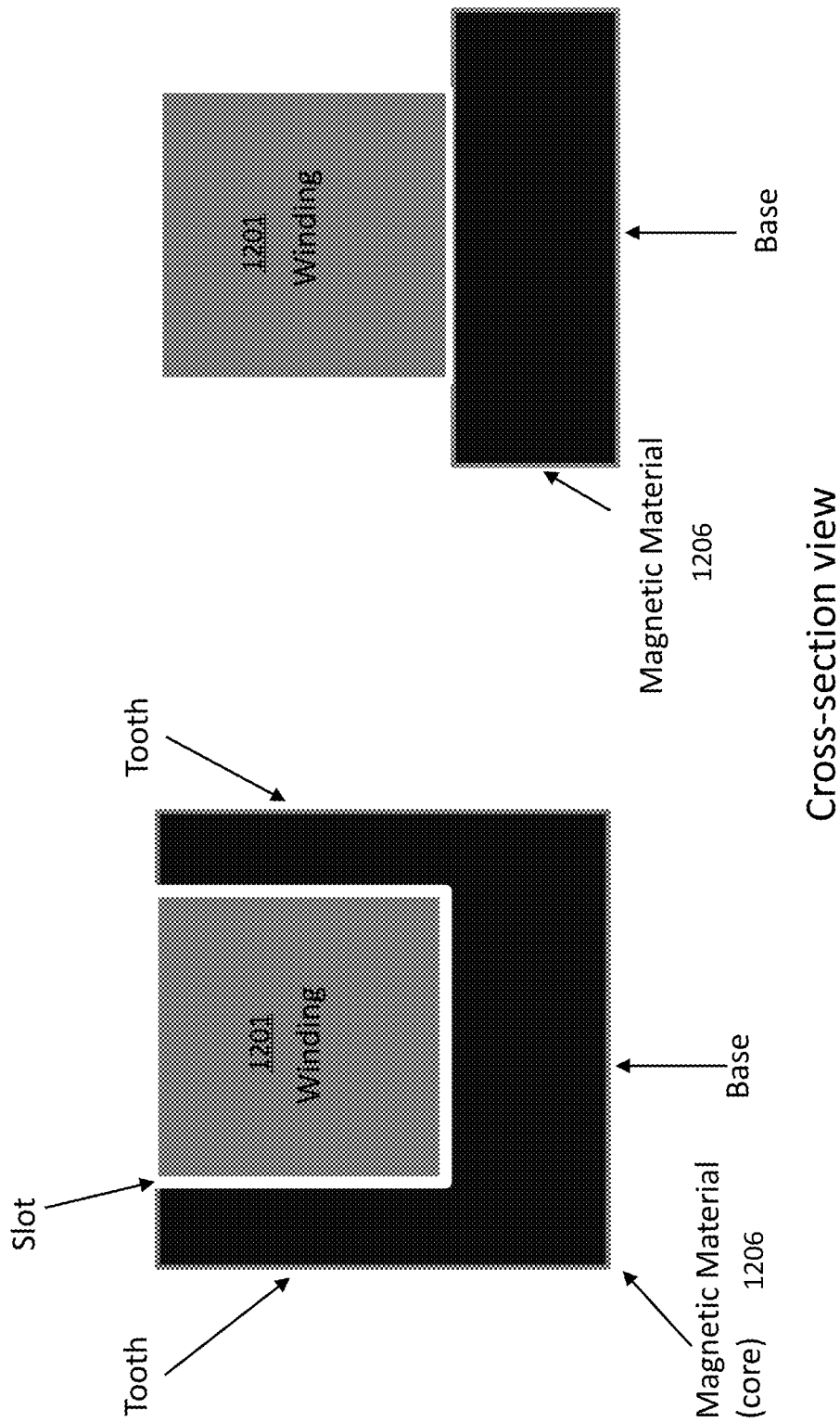

MODULAR AND EFFICIENT WIRELESS POWER TRANSFER SYSTEMS

CROSS REFERENCE TO RELATED APPLICATIONS

This application is related and claims priority to U.S. Provisional Application No. 62/559,592, filed on Sep. 17, 2019, entitled "Modular and Efficient Wireless Power Transfer Systems", which is herein incorporated by reference.

TECHNICAL FIELD

The present invention relates to power conversion and power electronics devices and systems, and, in particular embodiments, to high efficiency wireless power transfer systems.

BACKGROUND

Wireless power transfer (WPT) is desirable for many applications due to better customer experience and better tolerance of harsh environment. Although the basic theory of WPT has been known for many years, and WPT technologies have been used in some applications in recent years, it has been a challenge to achieve high efficiency wireless power transfer at low cost. Also, the EMI and noise from a WPT system can cause interference to electronic devices, and may present hazards to people and other animals in the close environment, which are significant concerns when the power of the WPT system is high.

Therefore, improvements are needed to design a wireless charging system with good performance. The goals include accomplishing high power WPT systems with high efficiency, low magnetic emission, and low cost.

SUMMARY OF THE INVENTION

These and other problems are generally solved or circumvented, and technical advantages are generally achieved, by preferred embodiments of the present invention which provides an improved WPT system based on advanced resonant power conversion.

According to one embodiment of this disclosure, a device has a plurality of coils arranged along a perimeter within the device, where each coil has a winding configured to be coupled to a power converter through a resonant capacitor, and forms a resonator with the resonant capacitor. The device has also a connection core which is magnetically coupled to the plurality of coils. Furthermore, the device has a plurality of power converters, where each power converter is coupled to one of the plurality of coils, and is configured such that a current flowing through the winding of the coil has the same frequency as other winding currents in the device, and the phase angle of the current is approximately equal to the space angle of the coil, so a rotating magnetic field is formed in a space around the device.

According to another embodiment of this disclosure, a system includes an input port having an input voltage, a first power converter coupled to the input port and having a first switch network with a plurality of first power switches, an output port having an output voltage and an output current, and a second power converter coupled to the output port and having a second switch network with a plurality of second power devices. The system also includes a resonator block comprising a plurality of resonators in which each resonator has a resonant capacitor, and a first resonator of the plurality of resonators is coupled to the first power converter, and a second resonator of the plurality of resonators is coupled to the second power converter. The system further includes a connection block having a switching device and coupled to the first resonator, and the connection block, the first resonator and the second resonator are configured such that the system operates in a wireless charging mode with the resonator block activated or a wired charging mode with the connection block activated.

According to yet another embodiment of this disclosure, a method consists of configuring an output port of a wireless power transfer system having an output voltage and output current, and providing a plurality of first resonators, where each first resonator has a first resonant capacitor and a first coil. The first coils are placed along a first perimeter, and through the first resonant capacitors the first coils are connected to a plurality of first power converters having a plurality of first power switches. The method also includes providing a plurality of second resonators, where each second resonator comprises a second resonant capacitor and a second coil. The second coils are placed along a second perimeter, and through the second resonant capacitors the second coils are coupled to a plurality of second power converters having a plurality of second power switches. The method further includes establishing a magnetic coupling between the first coils and the second coils, and configuring a control block to control the system such that a rotating magnetic field is established between the first coils and second coils in a mode of operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 illustrates an arrangement of multiple windings for a WPT system in accordance with various embodiments of the present disclosure;

FIG. 12A illustrates a cross section view of a winding in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in high power WPT systems. The invention may also be applied, however, to a variety of other systems, including integrated circuits, power converters, power supplies, low power wireless power systems, any combinations thereof and/or the like. Hereinafter, various embodiments will be explained in detail with reference to the accompanying drawings.

Figure 1:
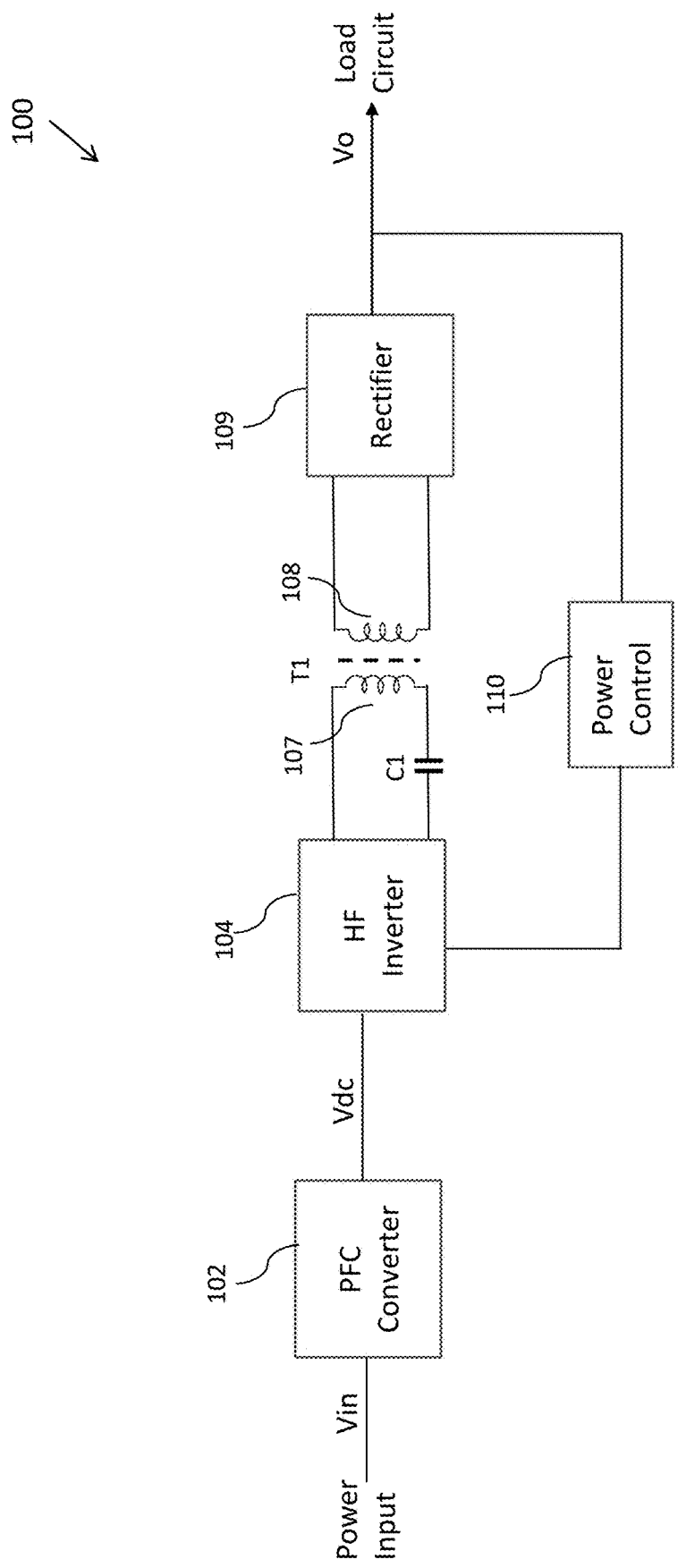
FIG. 1 illustrates a block diagram of a resonant power system.

Power efficiency, electromagnetic emission, system reliability and system cost have been critical factors impacting the design and adoption of WPT technologies. This application discloses several innovative techniques that can provide significant improvement in these aspects, and uses the battery charging of electric vehicles (EVs) as an example when applicable. For such a high power system, usually a wired charging system is collocated with a WPT system, and the power source may be ac power from a grid system, or dc power from a source such as solar panels or batteries, but ac input will be used mostly as an example. FIG. 1 shows a resonant power system 100 usually used in wired charging systems. A power conditioning block 102, usually a power factor correction (PFC) converter or other types of ac-dc converters, is used to convert ac power at the input (Vin) to a dc voltage Vdc, which is then converted to a high frequency ac voltage waveform through a high frequency (HF) inverter 104. The high-frequency voltage is then fed to a primary resonant tank comprising a resonant capacitor C1 and a resonant inductor network comprising a primary winding 107 of a power transformer T1. A secondary winding 108 of T1 is coupled to a rectifier 109, which converts the ac voltage across T1 to a dc output voltage Vo, which can be applied to various load circuits, such as batteries or down-stream power converters. The power control, sometimes to regulated output voltage Vo and sometimes to regulate output current supplied to the load circuit, is usually implemented as a frequency control of the HF power inverter 104. Duty cycle control of the HF inverter may also be used if needed. Through proper selection of capacitance of C1 and resonant inductance including the leakage inductance of T1, the power switches in the HF inverter can usually operate under a soft-switching condition, such as zero-voltage switching.

Figure 2:
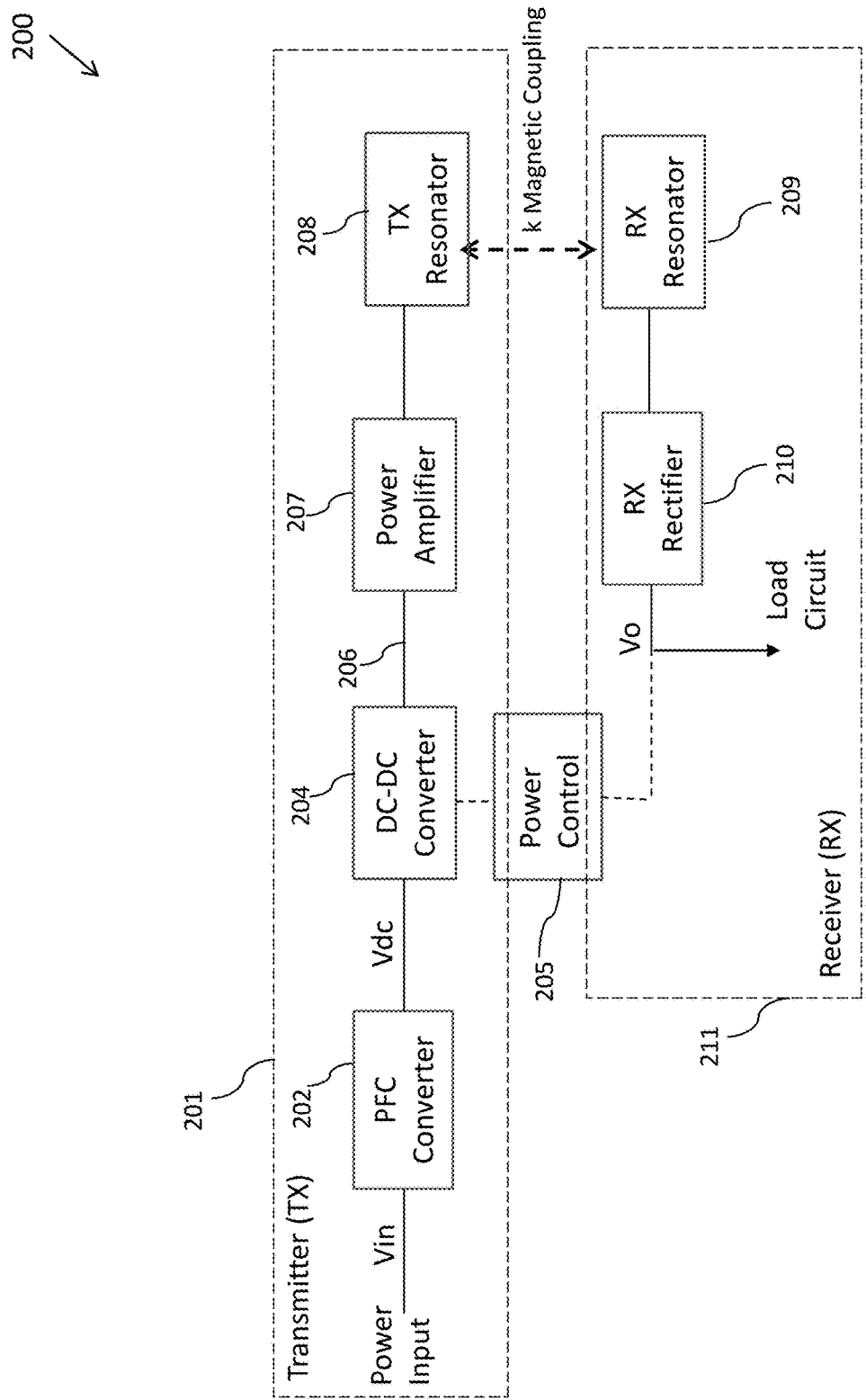
FIG. 2 illustrates a block diagram of a WPT system.

FIG. 2 shows a typical WPT system 200 with magnetic resonance (MR) technology, which includes a power transmitter (TX) 201 and a power receiver (RX) 211. Similar to FIG. 1, a PFC converter 202 is used to convert ac power at the input to a dc voltage Vdc, which is then converted to a high frequency ac voltage waveform. In conventional MR technology, the resonant coupling link has no power control capability, so the high-frequency ac voltage is generated through two stages: the first stage is a dc-dc converter 204 which converts the dc link voltage Vdc to another suitable dc voltage 206 to control the power at the output of the RX 211, and the second stage is a power amplifier 207 which converts the dc voltage 206 to a high-frequency ac waveform, usually at a fixed duty cycle (typically 50% in a half-bridge or full-bridge topology). The high-frequency voltage is then fed to a TX resonator 208 comprising usually a resonant capacitor and a transmitter coil, and optionally a filter or impedance circuit may be used to reduce the harmonic contents of or intentionally add some harmonic contents to the current in the transmitter coil. These circuits form a power transmitter 201. The power receiver 211 comprises a RX resonator 208 (usually consisting of a RX resonant capacitor and a RX coil) and a RX power conditioning circuit 210 (usually a rectifier). When the RX coil is put in the proximity of the TX coil (i.e. in the charging area), a magnetic coupling is established between these coils, and energy can be transferred between them. The power condition circuit 210 can convert the ac voltage in the RX resonator to a voltage suitable for the load circuit, usually a dc output voltage Vo across an output capacity Co. The output voltage can be applied to various load circuits, including batteries or down-stream power converters. When the RX is placed nearby the TX, the RX coil becomes magnetically coupled to the TX coil, and can pick up energy from the TX coil. The power control, sometimes to regulate output voltage Vo and sometimes to regulate output current supplied to the load circuit, is usually implemented as a voltage control to the dc voltage 206 of the dc-dc converter in the TX. As the TX and the RX are physically different units, to implement the power control a communication channel between the TX and the RX needs to be provided. Sometimes this communication is through an in-band communication which modulates a frequency or load in the RX or TX. Sometimes this communication is through an out-band communication such as a Bluetooth or NFC (near-field communication) channel.

For high power WPT applications, it is usually more desirable to use a modular design approach. It is also more economical to share as many circuits as possible between the wired charging system and the wireless charging system. Also, in a modular design it is desirable to improve system performance by further arranging the power converters, the TX coils, and/or RX coils into modules, and coordinating the operation between multi modules. The following discussion presents innovative techniques that enhance various aspects of system performance.

Figure 3:
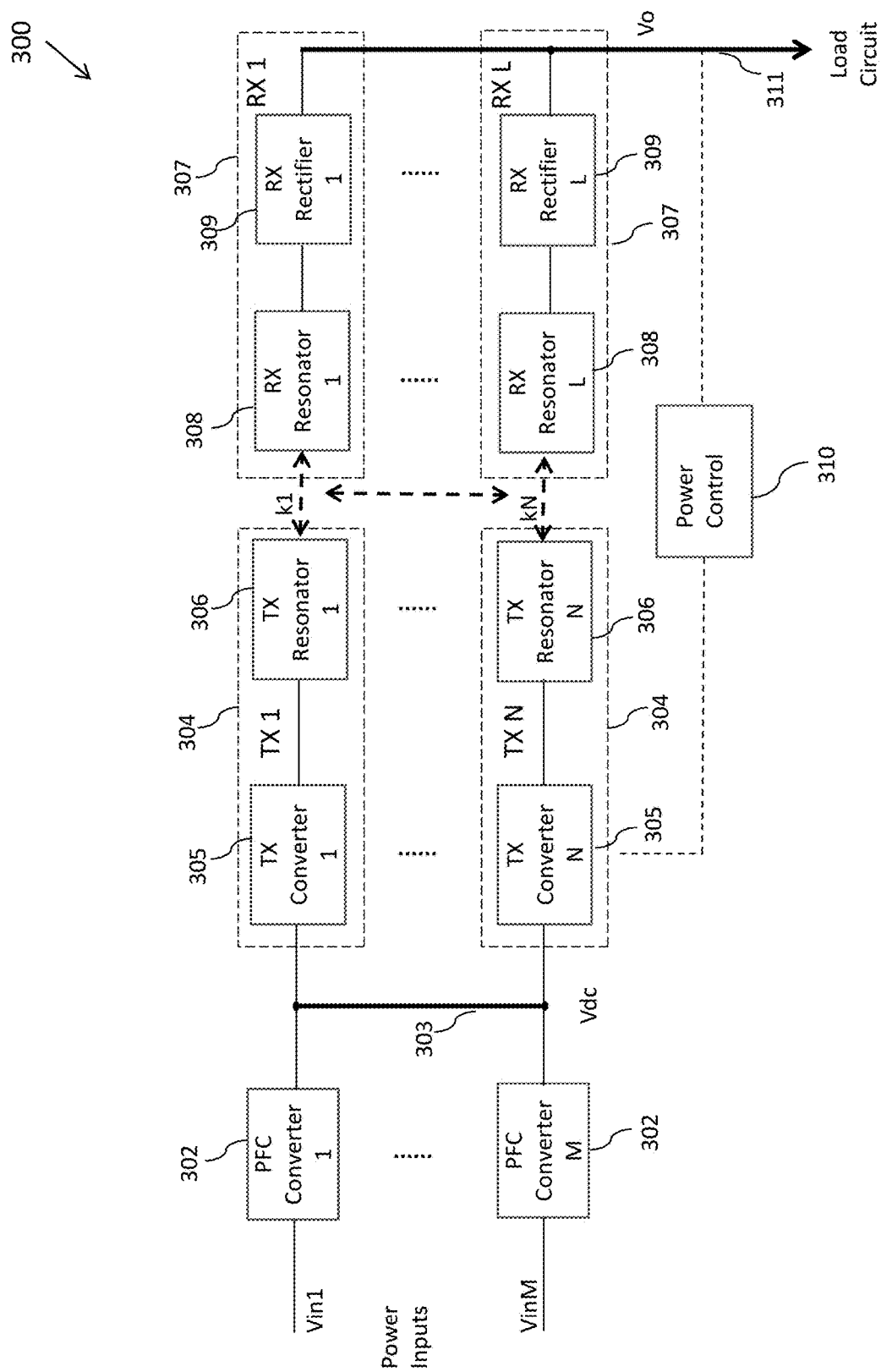
FIG. 3 illustrates a block diagram of a modular WPT system in accordance with various embodiments of the present disclosure.

FIG. 3 shows a modular WPT system which is compatible to and can be integrated with a wired charging system. The power architecture is similar to the one shown in FIG. 2, except that a plurality of power buses are added. The input 301 of all input power modules 302 may be from a common source, or several separate sources (labeled as Vin1 to VinM in FIG. 3). The outputs of M input converters 302 can be coupled together to form a dc link bus Vdc 303, so the power of these PFC converter can be added together. If desired ORing and/or current-share functions can be implemented in the input converters. The switching frequencies of these input converters may be synchronized with symmetrical phase shifts between them, so the noise in the modules and the current ripple of the capacitors on the dc bus can be minimized. In light load, some of the input modules may be shut down, so the total power losses can be reduced. Also, the input converters can be designed and controlled with redundancy, so if some of them fail the system can continue to operate, resulting in significantly improved system reliability. N transmitter modules 304, each may comprise a TX converter 305 and a TX resonator 306, are connected to the dc link bus 303, and are configured to generate a magnetic field to be magnetically coupled to receiver modules 307. The transmitter modules should be controlled such that the magnetic field generated by these modules are more or less smooth and even in the charging area, so RX modules may work with high efficiency regardless the positions of the RX modules in the charging area. In FIG. 3, L RX modules 307, each consisting of a RX resonator 308 and a RX power conditioner (usually a rectifier) 309, are shown. The output of L RX rectifiers 307 in L receivers are coupled together to form an output bus Vo. In some embodiments, some receiver modules may generate different output voltages if a system has such multi-output need. If the TX coils are configured to form a unified magnetic field, the number of transmitter modules/coils may be different from the number of receiver modules/coils. That is, K, L and N may be equal or different. This gives the system designer more flexibility to optimize the system design, and to make a system to be adaptable to different receivers which may have different power levels and other requirements.

The TX converter 305 may be a single stage inverter such as half-bridge, full-bridge or push-pull inverter as is well known in the industry, or it may be a combination of a dc-dc converter to regulate a voltage at its output and an inverter coupled to the output of the dc-dc converter. The inverters may be controlled with 50% duty cycle, and the switching frequencies of all inverters may be synchronized with symmetrical phase shifts between them. The TX coils of the power transmitters may be magnetically coupled together and form a TX coil assembly. Similarly, the RX coils of the power receivers may be magnetically coupled together and form a RX coil assembly. The power control may be accomplished through a communication channel between the TX and the RX. The power control can be implemented as a central controller at the system level, i.e. use a single power control block 310 to control all TX converters. Alternatively the power control may also be implemented as a distributed control configuration, in which a power control block 310 may control part of or even just one of the TX modules 304, and there are multiple power control blocks in the system with one or multiple communication channels between the RX side and the TX side. Sometimes the communication between the RX side and the TX side is through an in-band communication through modulating a frequency or load in the RX or TX. Sometimes this communication is through an out-band communication such as a Bluetooth, WiFi or NFC (near-field communication). The power control can also be split between the TX side and the RX side of the system. For example, the output voltage/current/power can be controlled in the RX side, through resonance modulation of changing the resonant frequency of the RX resonators, or through controlling a dc-dc power converter incorporated in the RX rectifiers. The reactive power, which is directly related to the soft-switching of the power switches in the TX converters, can be controlled in the transmitter side, through resonance modulation or capacitor switching in the TX resonators or current and voltage control. The communication channel between the RX side and TX side can be used to coordinate the control actions in the TX side and RX side to optimize system performance such as system efficiency improvement.

In light load, some of the TX modules (TX1 through TXN) or RX modules (RX1 through RXL) may be disabled or shutdown, so the total power losses can be reduced. Also, the RX modules RX1 through RXK can be controlled with redundant function, so if some of them fail or not in a good position to transfer power efficiently, the system can continue to operate with the remaining modules, so the system performance and reliability are significantly improved. A current sharing function may also be implemented among the TX modules and/or RX modules. At each of input stage, transmitter stage and receiver stage, the power control may be implemented at the module level, treating the system as multiple modules in parallel, or may be implemented centrally treating the whole system as one multi-phase system, as discussed earlier.

Many of the circuits and control algorithms may be shared between a wired charging system to save total system cost. For example, all the input converters, TX converters, and maybe the RX rectifiers may be shared with a collocated wired charging system. All or part of the resonant capacitors, as well as the power transformers may also be shared between a wireless power transfer system and a collocated wired charging (or power) system.

Figure 4A:
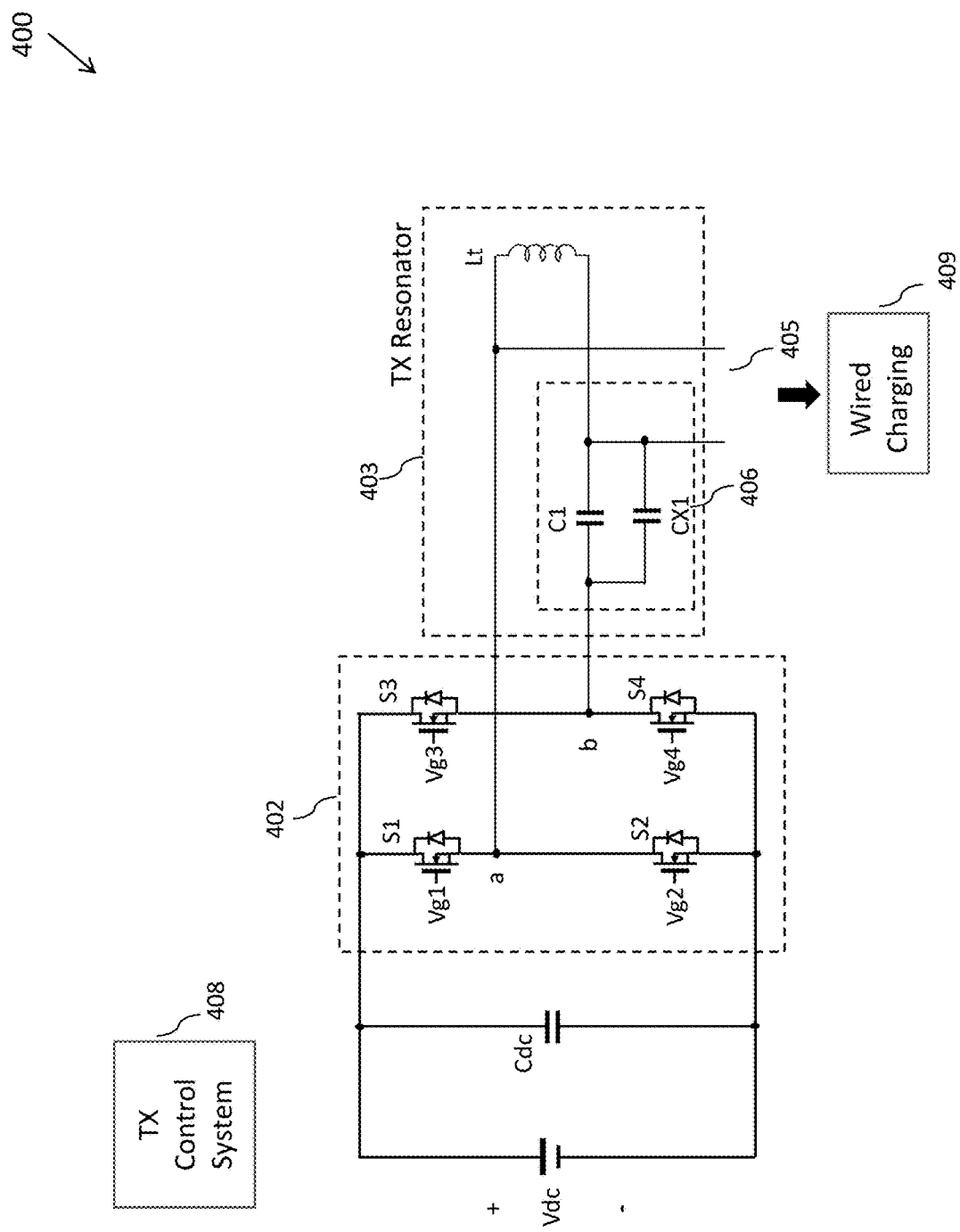
FIG. 4A illustrates a schematic diagram of a WPT transmitter in accordance with various embodiments of the present disclosure.

FIG. 4A shows an example of component sharing in a transmitter circuit 400. Power switches S1 through S4 forms a full-bridge transmitter converter 402 which is coupled to a dc voltage Vdc at the input 401, and produces a high frequency voltage at the output port across point a and point b. Of course, other types of topologies, such as half-bridge, multi-level, push-pull and hybrid converters can also be used. C1 and Cx1 form a resonant capacitor 406, and together with transmitter coil Lt form a transmitter resonator 403, where C1 and/or Cx1 (or part of them) may be a resonant capacitor used also in wired charging system in a resonant topology such as LLC power converter. C1 may not be part of wired charging system, or even may not be present in an actual design. Cx1 may be additional capacitor switched in when the system is switched to work in wireless power transfer mode, or in case C1 is not present the whole transmitter resonant capacitor. Cx1 may be a variable capacitor whose capacitance can change over a wide range relatively smoothly, or a switchable capacitor whose capacitance has a limited range of values with bigger steps selectable by the control, so that the resonsystemant frequency of the resonator may be selected or changed over a certain range in view of possible inductance change in Lt. An example implementation of a switchable capacitor will be shown in FIG. 7 and described later. The voltage across L1 may be used as a shared port 405 to be coupled to a wired charging system. Alternative, the output voltage from the TX converter (across points a and b in the switch bridge) may be used as a shared port 405 and coupled to a wired charging system. That is, the TX converter and circuit before it, and optionally the resonant capacitor 606, may be shared between the wireless charging system and the wired charging system, and such circuits can be located inside the wireless charging system, or the wired charging system, or as a separate subsystem shared by both.

Figure 4B:
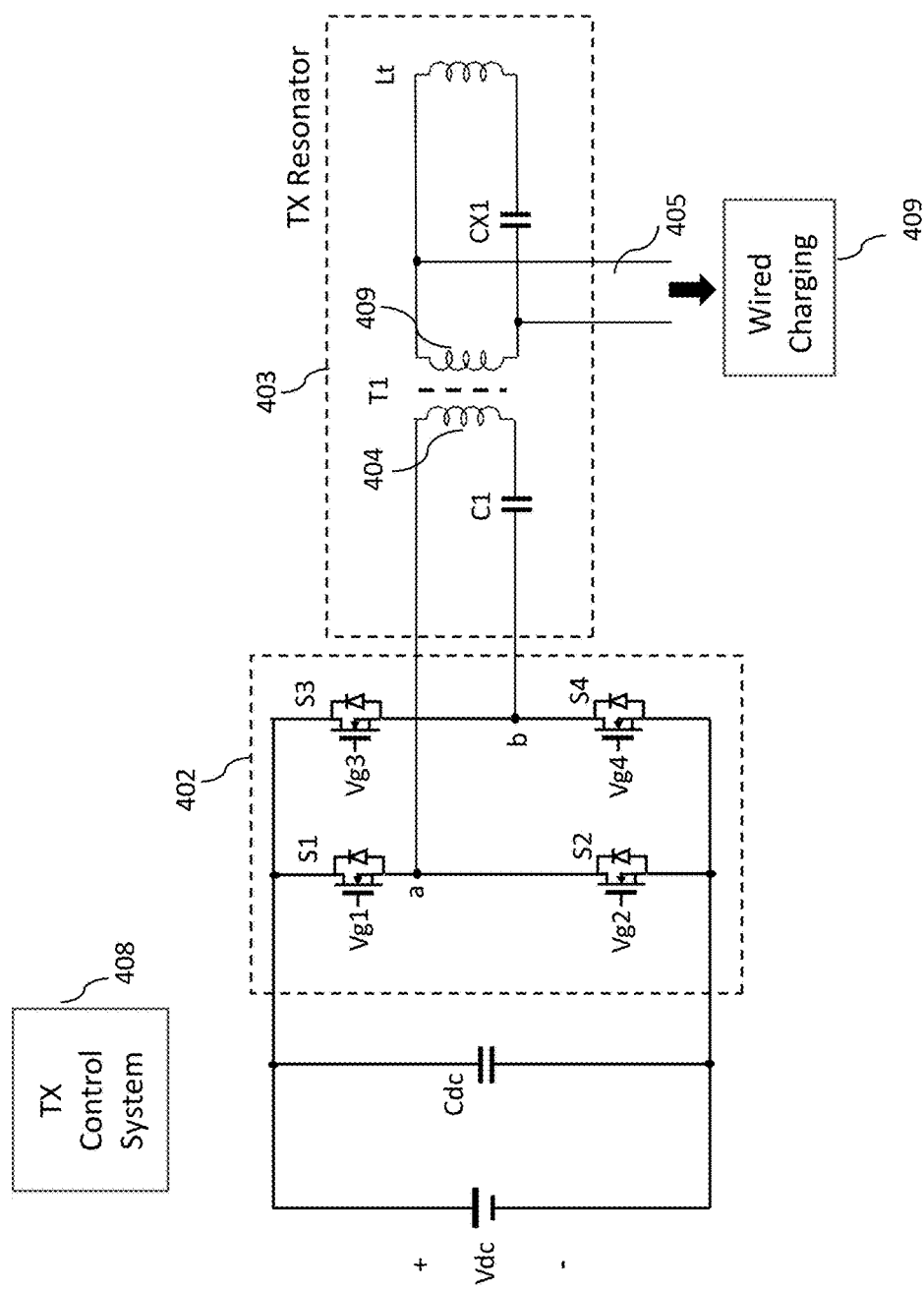
FIG. 4B illustrates a schematic diagram of another WPT transmitter in accordance with various embodiments of the present disclosure.

FIG. 4B shows another example of sharing components in a transmitter 400. Here a power transformer T1 and a capacitor C1 are added compared to the transmitter 400 shown in FIG. 4A. Since the leakage inductance of T1 is usually designed to be much lower than the inductance of TX resonant coil Lt, the circuit operation is not changed significantly from the transmitter 400 discussed above, except that T1 scales the voltage up and down with a turns ratio, and the leakage inductance of T1 becomes part of the resonant inductance of the resonant tank. This scaling can bring the voltage rating of a resonant capacitor Cx1 and any control switches inside it to reasonable values to allow better selection of components, and also meet safety requirements more easily. C1 and Cx1 are in series and together function as a resonant capacitor. C1 may be a resonant capacitor when its capacitance value is relatively small, or may just perform a dc-blocking function when its capacitance value is very big, for example three times bigger than that of Cx1. Cx1 and/or C1 may be implemented as switchable or variable capacitors. Now a wired charging system may be coupled to the WPT system across a primary winding 404 or a secondary winding 409 of T1, across Lt, or across the output voltage of the switch bridge. That is, the TX converter and circuit before it, and optionally C1, T1 and/or CX1 may be shared between the wireless charging (wireless power transfer) system and the wired charging system, and such circuits can be located inside the wireless charging system, or the wired charging system, or as a separate subsystem shared by both.

Figure 5:
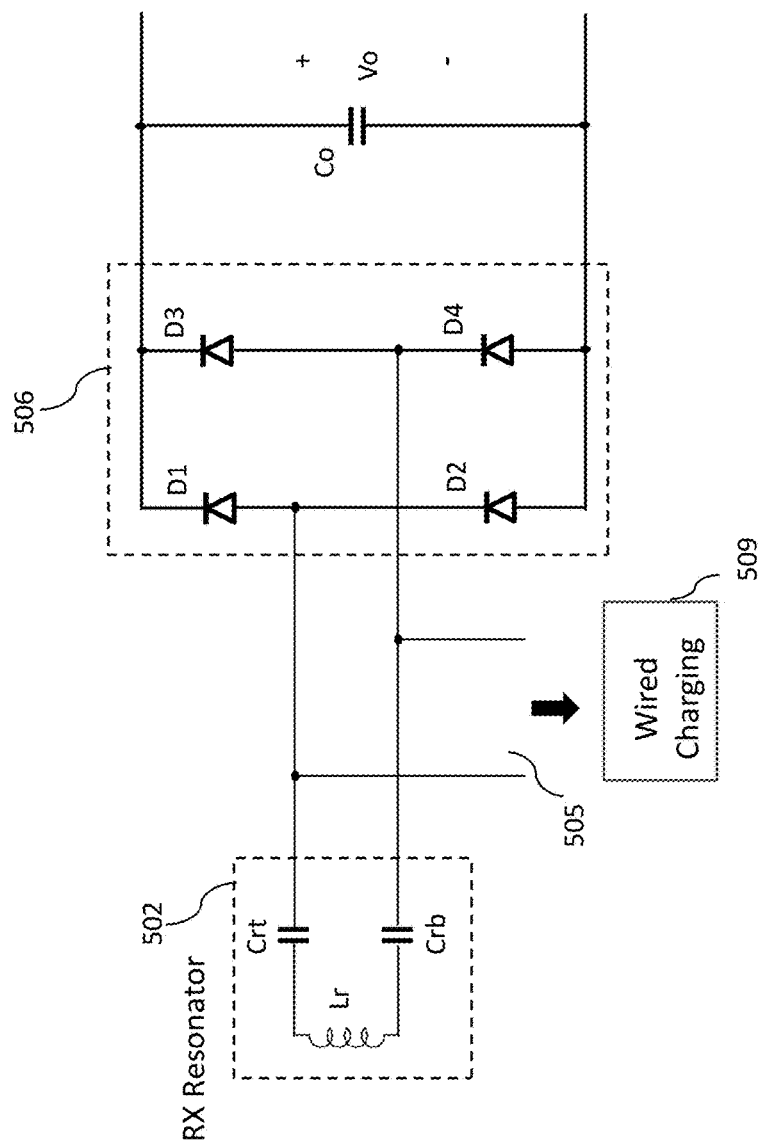
FIG. 5 illustrates a schematic diagram of a WPT receiver in accordance with various embodiments of the present disclosure.

FIG. 5 shows a way in which wireless charging and wired charging may share a RX rectifier. Here the resonant capacitor in the RX resonator is optionally split into two capacitors Crt and Crb, which may be replaced by a single capacitor if needed. Again Crb and/or Crt may be implemented as a switchable or variable capacitor. The receiver coil Lr and resonant capacitors Crt/Crb form a receiver (RX) resonator 502. When the receiver 500 is in a charging zone of a transmitter, it is exposed to the magnetic field generated by the transmitter coils, and energy can be transferred between the receiver and the transmitter. The receiver resonator can be designed to optimize such energy transfer in practical applications. The receiver conditioning circuit 506 is shown as a full-bridge rectifier comprising diodes D1 through D4. The circuit 506 converts the energy received from Lr to a form suitable for the load. When it is implemented as a rectifier, it produces a stable dc voltage Vo at the output port 508. As is well known in the industry, other switching devices such as MOSFETs and IGBTs can be used in a rectifier as synchronous rectifier devices, or other circuit types such as half-bridge rectifiers, ac-ac converters, dc-dc converters or any combination thereof may be used to produce an output most suitable for the load.

The wireless charging system may be coupled to a wired charging system at input port 505 of the RX conditioning circuit 506 or across Lr, so that the RX conditioning circuit and circuits following it, and optionally the receiver resonant capacitors may be shared between the wireless charging system and the wired charging system, and such circuits can be located inside the wireless charging system, or the wired charging system, or as a separate subsystem shared by both.

Figure 6:
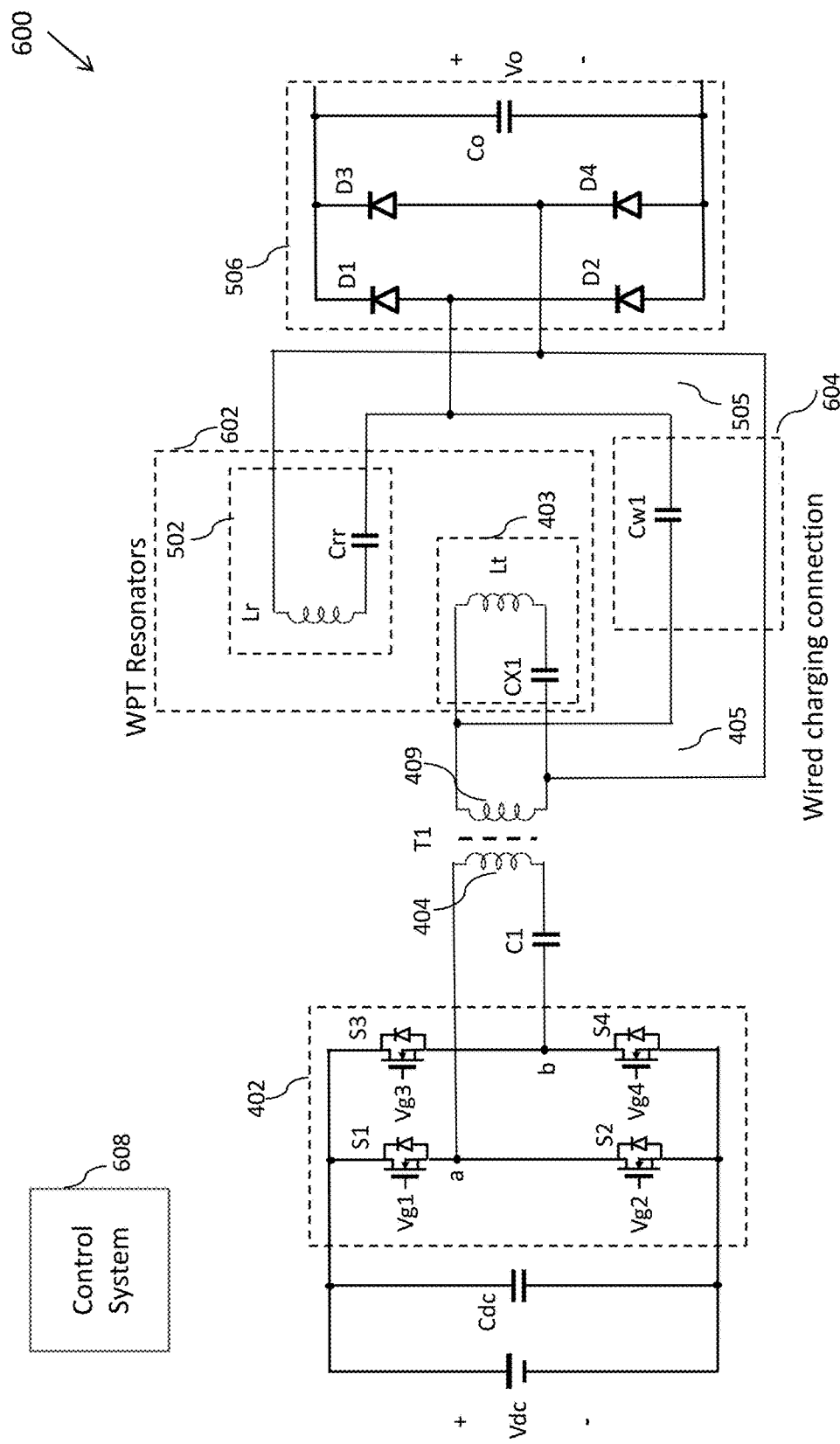
FIG. 6 illustrates a block diagram of a combined WPT system and wired charging system in accordance with various embodiments of the present disclosure.

FIG. 6 shows a block diagram of a charging system 600 integrated both a WPT system (wireless charging) and wired charging, by incorporating the transmitter 400 in FIG. 4B and the receiver 500 in FIG. 5. On the input side other circuits such as PFC converters were omitted for the sake of brevity. The charger system 600 can function as both a wireless charger and a wired charger, and most components are shared between them. There is a WPT resonators block 602 which consists of a TX resonator 403 and optionally a RX resonator 502. There is also a wired charging connection block 604. Usually, only one subsystem, either the wireless charger or the wired charger is actively operating at a time. There may be switches in blocks 602 and 604 to disable one or both of these blocks when it is not in operation. Alternatively, a variable or switchable capacitor may perform the function of a switch since its capacitance can be set to different values to create different impedances: a very low value to create a high impedance which prevents significant current to flow through, or a very high value to create a low impedance circuit which allows significant current to flow through. For example, in FIG. 6 Cw1 may be set to the lowest possible value when the system is working in WPT mode, and the resonant capacitor CX1 and/or Crr may be set to the lowest possible value when the system is working in wired charging mode. Alternatively, a resonant capacitor in a resonator, such as CX1 or Crr, may be set to the highest value so the resonator exhibits a high impedance to disable or reduce the power transfer capability of the resonator when such power transfer is not needed. In other embodiments, in wired charging mode, the capacitance of a resonant capacitor (such as CX1 and/or Crr) may be set to a value so a resonator in the WPT path can improve the performance of the wired charging system, such as to help control a voltage or current at the output.

Figure 7:
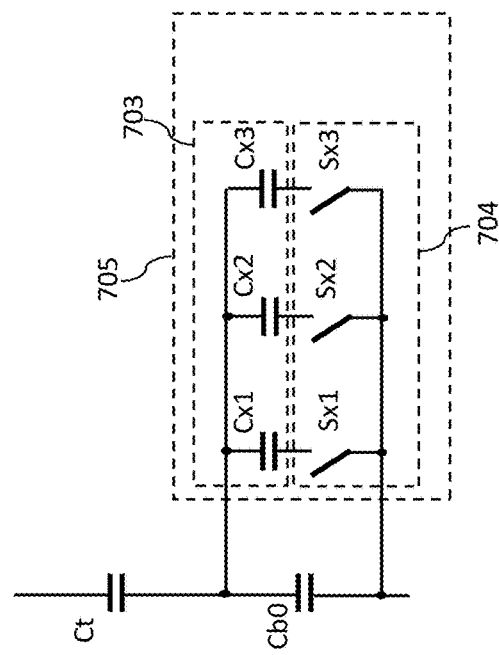
FIG. 7 illustrates a switchable capacitor in accordance with various embodiments of the present disclosure.

A switchable capacitor is configured as a network of capacitors and switches organized in a few branches, and FIG. 7 shows an example implementation. Different from a variable capacitor whose capacitance needs to change in a relatively large range smoothly (i.e. with a fine step, for example the step is less than 1% of its full value)), a switchable capacitor may have only a few branches so its capacitance can be switched between a limited set of capacitance (for example no greater than 16 values) in a relatively big steps. To reduce the voltage rating of each capacitor and/or switch, the switchable capacitor may be configured as multiple capacitors in series. In FIG. 7, Ct is the top capacitor, which can be a normal capacitor or also a switchable capacitor network. The bottom capacitor is shown as a switchable capacitor network 705. Cbo, which is optional, is in parallel with a few switch-capacitor branches, with 3 branches shown in the figure as an example. There are 8 different combinations of the control switches Sx1 through Sx3, considering each of these switches may be in ON or OFF state. The switchable capacitance can have a different equivalent capacitance under each of these combinations. This allows the capacitance of a resonant capacitor be changed according to control signals of the switches. When a higher number of switch-capacitor branches are used, and when the capacitance of the switchable capacitors in these branches can be arranged in a doubling relation (i.e. the capacitance of a capacitor is approximately twice the value of the one in an adjacent branch), the equivalent capacitance of the switchable capacitor can change over a wide range with approximately even and fine steps, so the switchable capacitor becomes a variable capacitor. Ct does not need to be physically connected to the bottom capacitor directly. For example, in FIG. 4A Ct may be moved to the other side of L1 without impacting the basic operation of the system. Such a more symmetrical arrangement can reduce the EMI of the system.

Switching means may be used to configure the system so only one subsystem is active at a time. For example, if the system is intended to work in wired charging mode then components and subsystems dedicated to wireless charging (for example L1 in FIG. 4A or L1 and Cx1 in FIG. 4B) are not activated. Similarly switching means may be used so in wireless charging mode the components and subsystems dedicated to wired charging system are not activated. Please note a resonant tank or a coil of a resonator may be de-activated by not switching the switches in the power converter coupled to it, or by making the resonant capacitance very small or very big so the operation of the resonant tank is far away from its resonant state and presents a high impedance. This may be achieved by controlling a switchable or variable capacitor.

In a modular design, multiple TX coils may be integrated into one TX magnetic structure such as a TX coil assembly, and the TX coils in a magnetic structure may be magnetically coupled together. Similarly multiple RX coils may be integrated into one magnetic structure such as a RX coil assembly. The magnetic coupling between the coils may be used to strengthen the magnetic field in a space close to a coil assembly. By carefully designing and locating the coils and controlling the currents in the coils, a smooth and strong magnetic field can be formed near the transmitter magnetic structure to provide a good charging space or charging area for intended RX coils, but outside the charging space the strength of the magnetic field may be significantly reduced to reduce EMI emission and noise while reducing system cost, size and weight. In this way, a good magnetic coupling can be maintained between the RX coils and TX coils even when there is a misalignment between the RX magnetic structure and the TX magnetic structure. One way to achieve this is to generate a rotating or traveling magnetic field in the charging space, which is similar to the rotating or traveling magnetic field in a poly-phase electric machine. FIGS. 8A to 8D (collectively FIG. 8) show examples of multiple coil arrangements in a magnetic structure, which may be a TX or RX coil assembly. The big arrow signs in FIG. 8 illustrate the direction of the rotating magnetic field. Of course, the magnetic field can also be configured to rotate in the opposite direction of the big arrows. FIGS. 9A and 9B (collectively FIG. 9) show some cross-section views which highlight the details of coils.

Figure 8A:
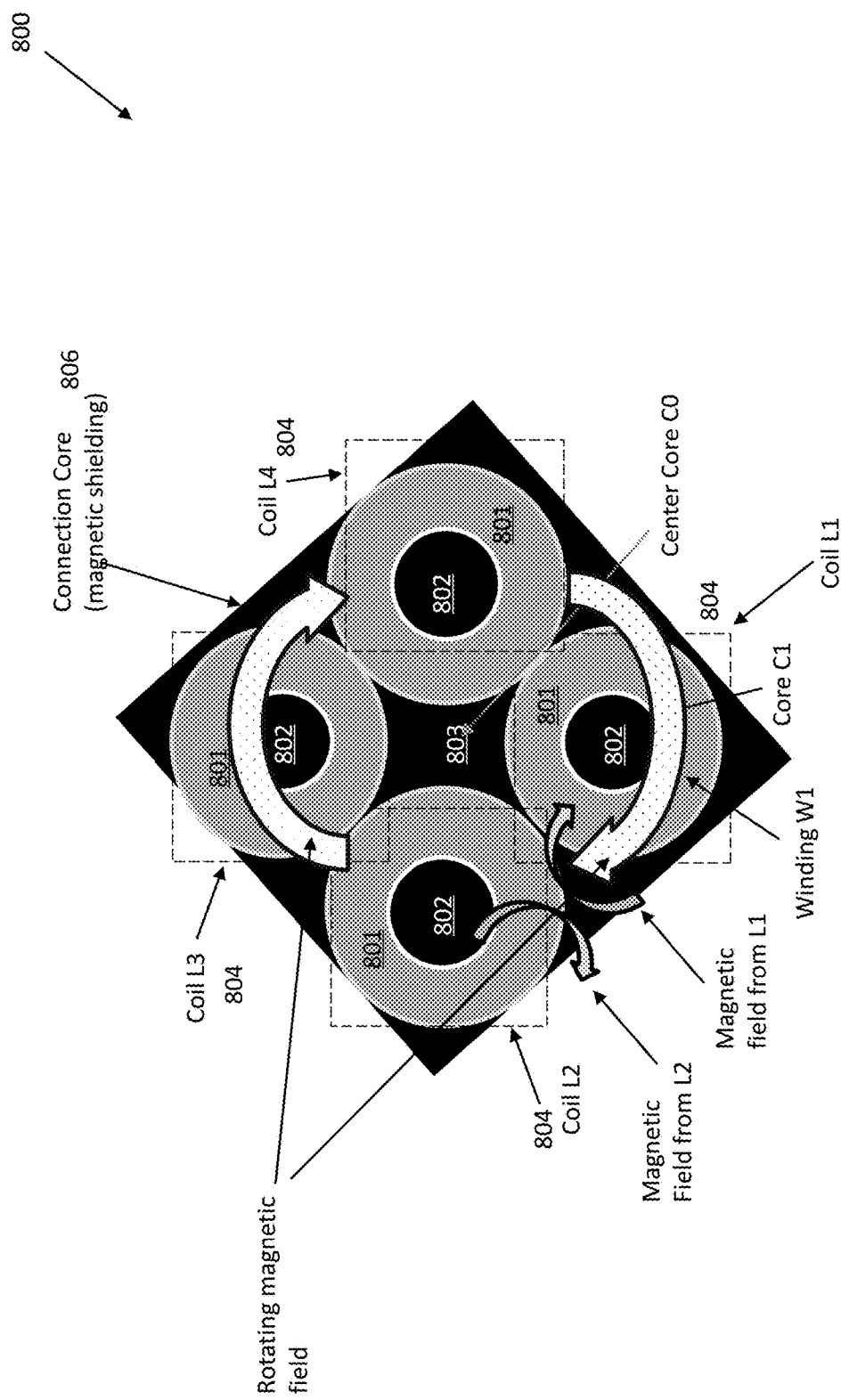
FIG. 8A illustrates a coil assembly for a WPT system in accordance with various embodiments of the present disclosure.
Figure 9A:
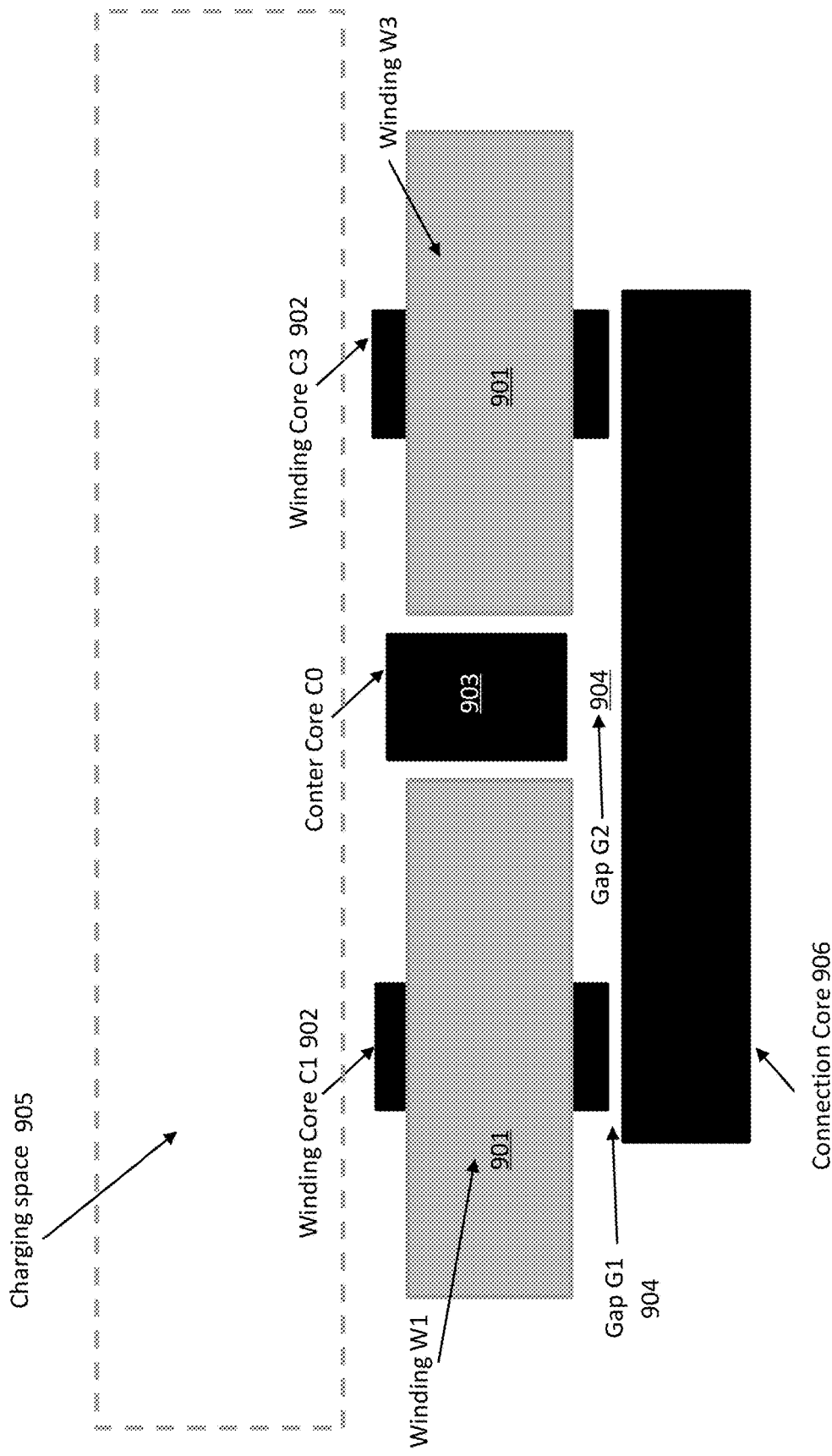
FIG. 9A illustrates a side view of a coil assembly for a WPT system in accordance with various embodiments of the present disclosure.
Figure 9B:
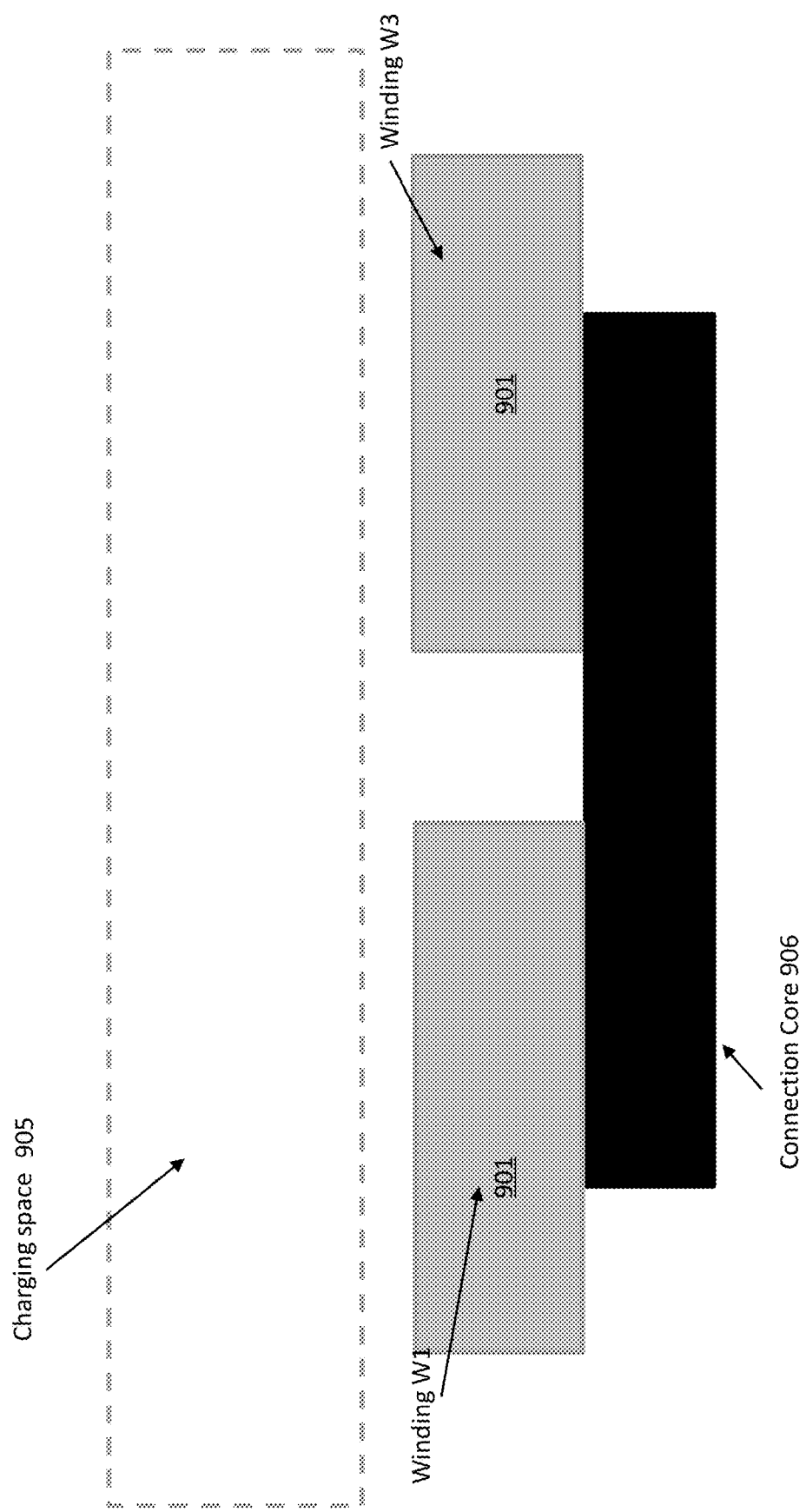
FIG. 9B illustrates a side view of a coil assembly for a WPT system in accordance with various embodiments of the present disclosure.

In the example of FIG. 8A, the coil assembly 800 consists of 4 coils labeled as Coil L1 through Coil L4, each consisting of a winding 801 around a magnetic winding core 802. Please note that the winding core 802 is optional, i.e. a coil may be an air-core coil. These coils may be arranged in a symmetrical and usual co-planar fashion in the magnetic structure, and are magnetically coupled by a connection core 806, which may be a plate or a plurality of plates made of magnetic materials such as ferrite, iron power, silicon steel, MPP materials, or magnetic films. Sometimes the connection core is also called a magnetic shield. Around the center of the magnetic structure, there may be one or more center cores Co 803, and some center cores may have windings around them in a similar way as in the 4 coils around the outside perimeter. These coils may be arranged in a symmetrical way as in a poly-phase electrical machine, and can generate a rotating or traveling magnetic field in the space above them when currents with the correct phase displacement flowing through them. The area or space where the rotating magnetic field is relatively strong can be used as a charging area or charging space. The winding cores, connection core and center cores can be made from ferrite, silicon steel or other suitable magnetic material. As is shown in FIG. 9A, there may be air gaps arranged between two cores, so that the magnetic coupling between coils may be adjusted by the length of the air gaps. The air gaps can also be arranged to separate the magnetic structure into several pieces such as bars or plates to simplify the manufacturing process and/or avoid harmful dimensional resonance which usually exists in a large core. The air gap may be filled with non-magnetic and non-metal material, such as glue or plastic which may help to hold different parts together, and such filling material may be used for cooling of the cores. Some of the winding cores, connection cores and center cores may be integrated to become a single core assembly. Other arrangement of the coils may also be possible. For example, they may not be symmetrical or coplanar. As long as they are magnetically coupled through core materials, such coupling can be used to the advantages of the WPT system design.

Figure 8B:
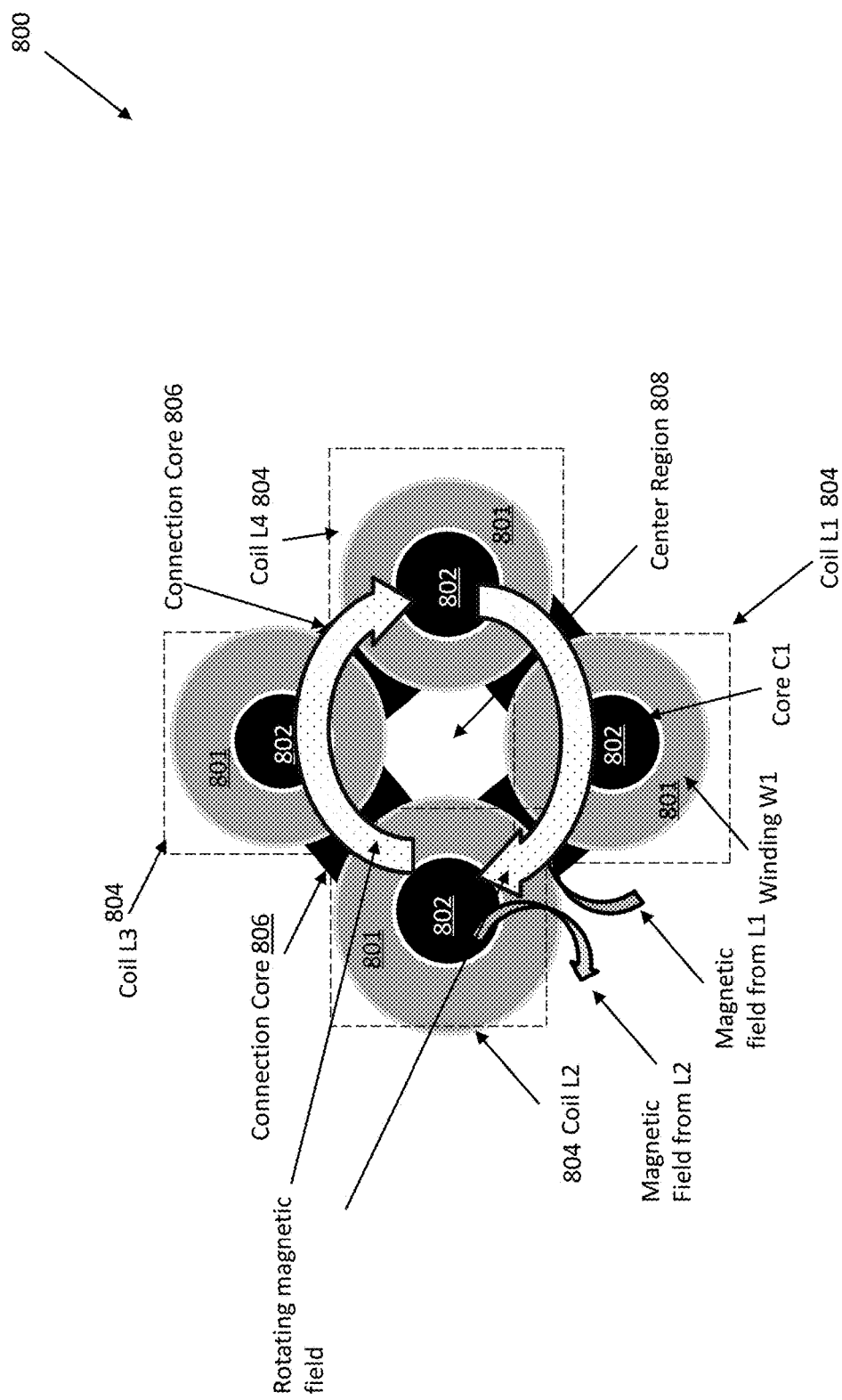
FIG. 8B illustrates a coil assembly for a WPT system in accordance with various embodiments of the present disclosure.

FIG. 8B shows another implementation of a coil assembly 800 which is similar to the one shown in FIG. 8A except that the connection core 806 comprises several bars. In the center area 808 there is no core nor winding. As is well understood in the industry, when the coils are arranged symmetrically, and the currents in the windings are also symmetrical (i.e. having the same amplitude and frequency, and a phase displacement between adjacent windings equal to 360°/N where N is the number of coils in the assembly), a rotating magnetic field is generated above the coils. In the center region 808 the magnetic field is weak (i.e. has a low flux density) so sensitive circuits such as sensors can be placed around there.

Figure 8C:
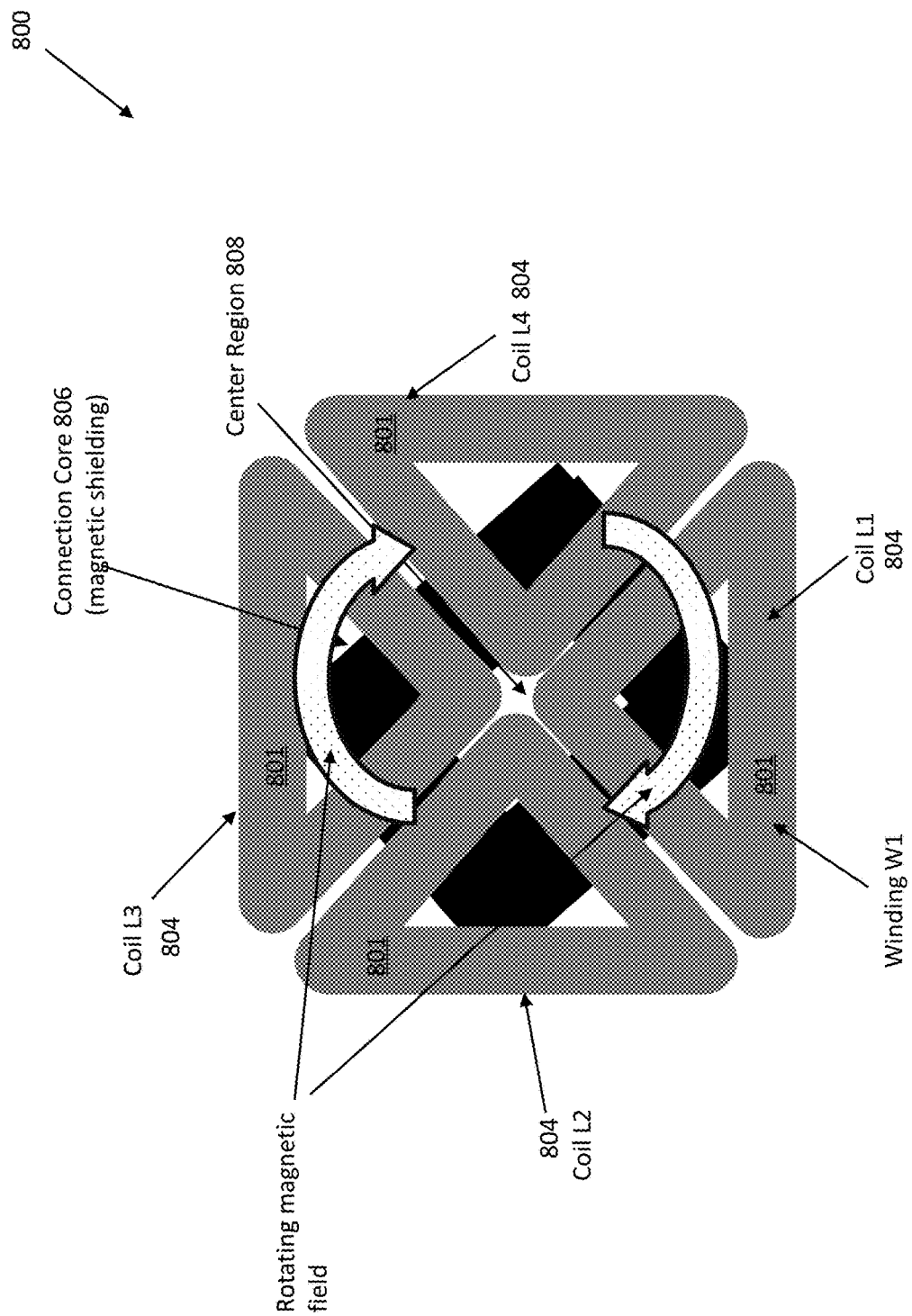
FIG. 8C illustrates a coil assembly for a WPT system in accordance with various embodiments of the present disclosure.
Figure 8D:
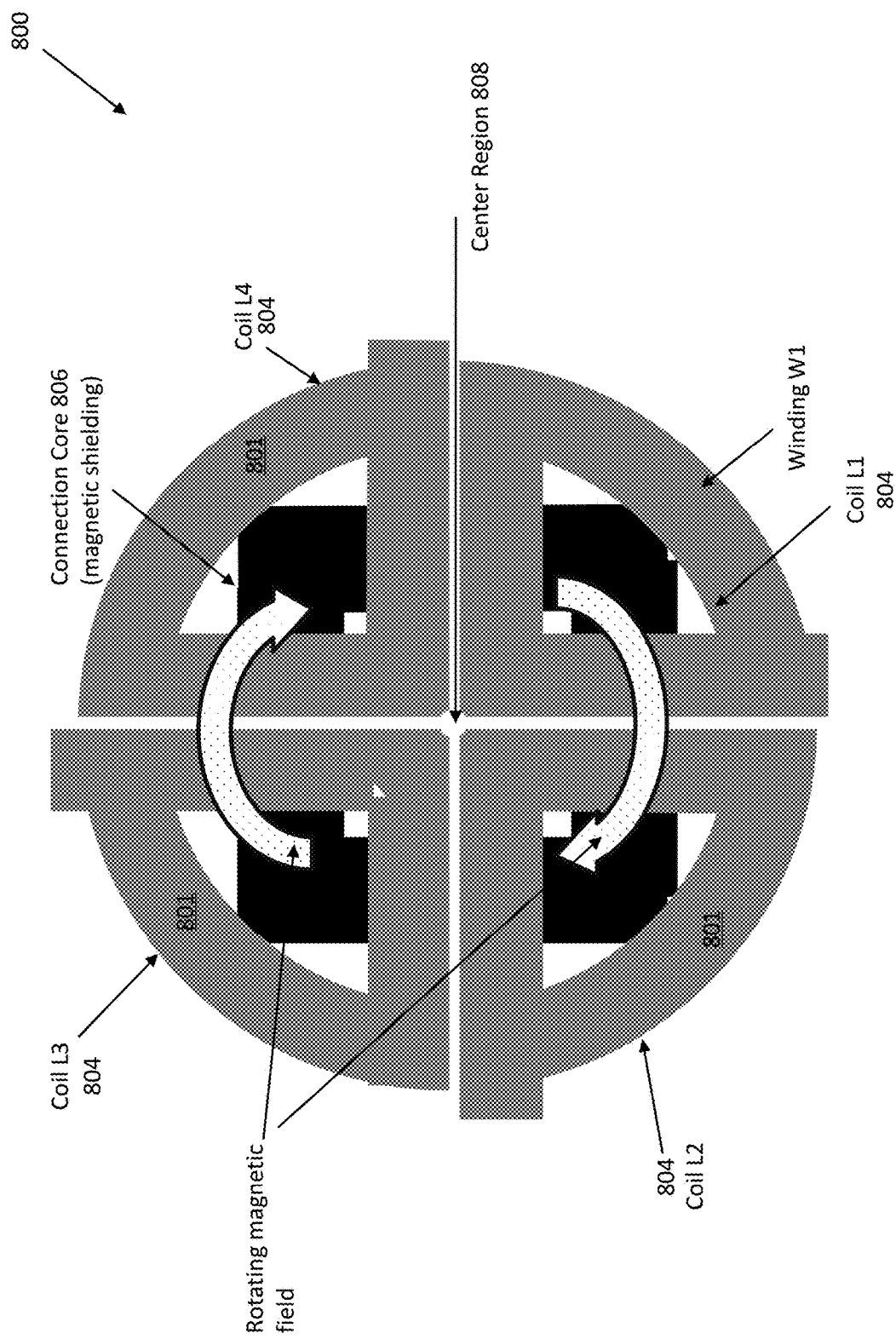
FIG. 8D illustrates a coil assembly for a WPT system in accordance with various embodiments of the present disclosure.

FIGS. 8A and 8B shows round or circular shape of coils. Other shape of coils may also be used. FIG. 8C shows an assembly with triangular coils to form a rectangular or square charging area. FIG. 8D shows an assembly with hybrid-shape windings to form a circular charging area, in which each winding is in a hybrid shape consisting of part of a triangle and an arc. The coil assemblies shown in FIGS. 8C and 8D operate in similar way to the coil assemblies shown in FIG. 8A except that the winding shape is different, and thus the charging area or space may also have a different shape. In a practical system, the winding shape and the number and location of coils in a coil assembly can be designed according to the actual needs of the system.

FIGS. 9A and 9B show side views of the coil assemblies shown in FIG. 8. In FIG. 9A, there is a core 902 in each winding 901, and two windings W1 and W3 are around winding cores C1 and C3. There is also a center core C0 903. The coils are coupled through a connection core 906 via air gaps 904. The length of the air gap coupled to the center core may be different from other air gaps. In FIG. 9B, each coil is an air-core winding, and there is no center core. In a practical design, whether to use a core in a coil, whether to have air gaps, and whether to use a center core are also choices to be decided according to system requirements.

Figure 10A:
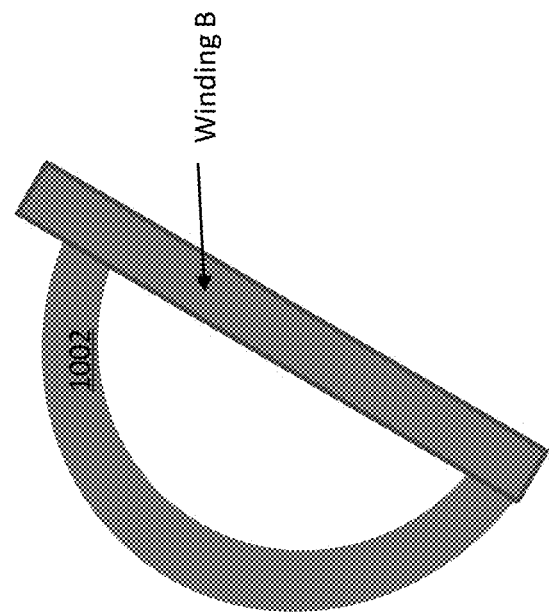
FIG. 10A illustrates an arrangement of multiple windings for a WPT system in accordance with various embodiments of the present disclosure.
Figure 10A:
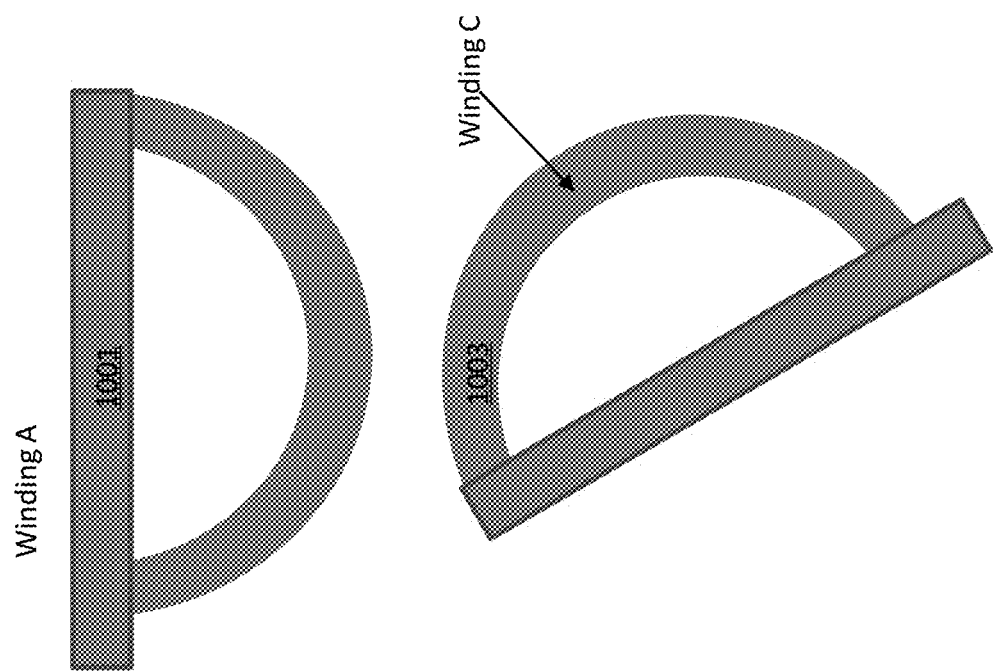
Figure 10B:
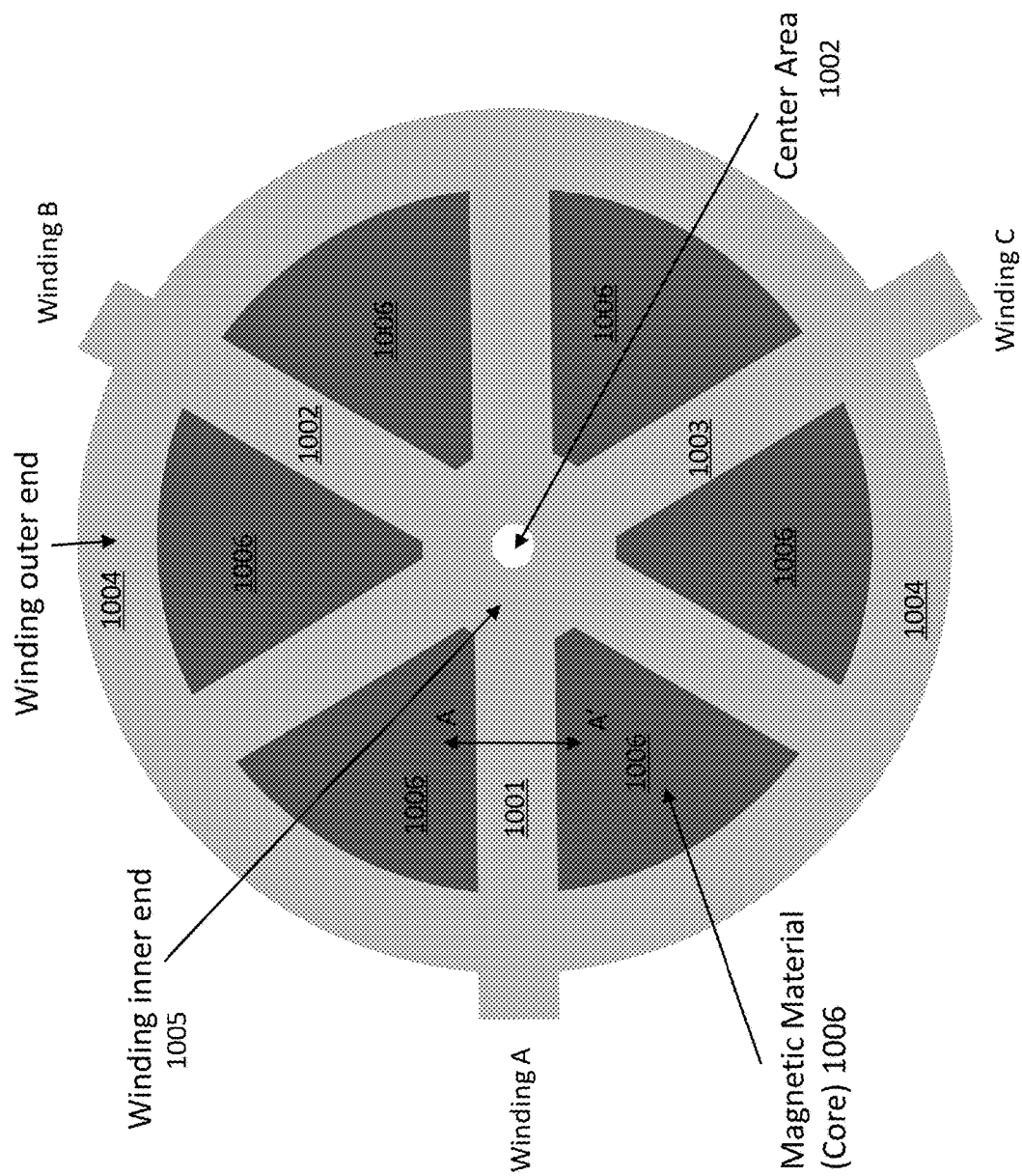
FIG. 10B illustrates a coil assembly for a WPT system in accordance with various embodiments of the present disclosure.
Figure 12B:
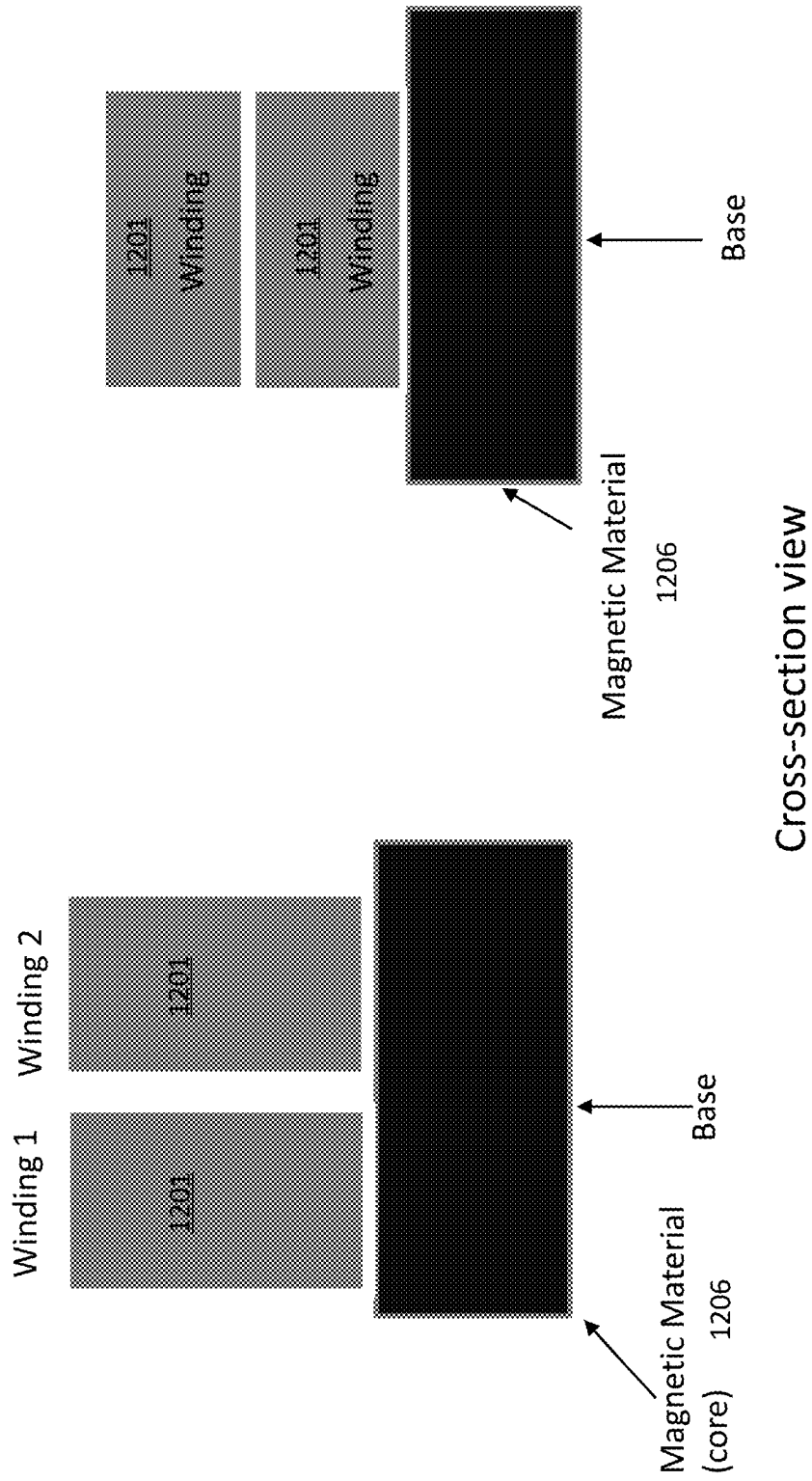
FIG. 12B illustrates a cross section view of a winding in accordance with various embodiments of the present disclosure.

The windings in a coil assembly may be interleaved, and may be arranged inside slots in a magnetic core in a way similar to the stator windings of a poly-phase axial-flux machine, as is shown in FIGS. 10A and 10B (collectively FIG. 10). Each winding may have the same design with the same shape and size, all windings in the coil assembly may be arranged in a symmetrical manner but with a space displacement along the perimeter of the coil assembly. One or both ends of a winding may be brought out as a connection, and each connection can be coupled to a power converter of a transmitter or a rectifier of a receiver through a resonant capacitor, so a near-sinusoidal current can be fed into it during operation. The center of the magnetic structure may optionally have one or more center cores, and some of these center cores may have a winding around it. Each winding may have multi turns, and the windings may also be interleaved as in convention ac motors. FIG. 10A shows three identical semi-circular coils arranged with 120° displacement in space. Generally, if there are N coils arranged along a perimeter of the coil assembly, the space displacement among them should be about 360°/N to maintain a symmetrical arrangement, which helps to generate a smooth rotating magnetic field when currents with the same phase displacement flow in them. Other shapes such as elliptical, rectangular or irregular shapes, can also be used to configure the wingdings, and the number and displacement angles may change to better suit a system. FIG. 10B shows that the three windings of FIG. 10A are placed in a magnetic core 1006, and are interleaved with each other to further enhance the magnetic coupling between these coils. Examples of how the conductors of a winding may be coupled to the core are be shown in FIGS. 12A and 12B (collectively FIG. 12). FIG. 12 are side views cut through line A-A' in FIG. 10B. In FIG. 12A, example layouts of windings in a slot is shown, where the windings in a slot may have multiple conductors which belong to one or more windings. Compared to the side view of FIG. 9A, the tooth serves as the function of winding core 902, and the base of the core serves as the function of the connection core 906. In a WPT system, both RX and TX designs can use this kind of magnetic structure, and the teeth may not have any tip as is shown in FIG. 12A, so the distance between adjacent teeth are relatively large, achieving a reasonable magnetic coupling coefficient between a TX coil and a RX coil. The right drawing in FIG. 12A shows that the magnetic material in the tooth part of the core may be removed, but the windings are still arranged in as if teeth were still there form an air-tooth structure. The air-tooth structure works similarly to the coil structure shown in FIG. 9B. FIG. 12B shows that multiple conductors or windings may be arranged in a top-bottom manner or a side-by-side manner, using air-tooth structure as an example.

When a RX magnetic structure is placed in proximation of a TX coil, magnetic coupling between RX coils and TX coils are established so energy can be transferred between them. The distance between the RX and TX magnetic structures can vary in a wide range, from a few mm to hundreds of mm. With the coil assembly discussed above, the magnetic field around the magnetic structure now is formed collectively by the windings/coils in the structure, and the number of coils may have little effect on the magnetic field in the charging space around the magnetic structure directly. In this way, the number, shape and size of RX coils may be different from the number of TX coils in a system, giving more freedom to the system design, especially when a transmitter is used to work with different receivers with different power levels in different systems, which is usually required in many applications such as automotive charging stations. Also, during an operation mode, some TX or RX resonators may be deactivated (i.e. the current in the associated coil is very low or zero), and the number of active TX coils (i.e. TX coils flowing with current to contribute to the magnetic field between the RX and TX coils) may be different from active RX coils. When a RX magnetic structure is placed in a nearby region facing a TX, its windings will generate voltages and/or currents through induction. Also, as the frequency of winding currents are usually high, significant power and/or energy can be transferred from TXs to RXs or vice versa over a relatively long distance at a good efficiency. When there is a failure in a winding or its associated converter, or when a module is shut down intentionally in light load to reduce power losses, the number of active modules in the system, including the number of active power converters and active coils in a coil assembly may be reduced. The phase displacement among the currents of coils in a coil assembly may be adjusted to generate a rotating magnetic field. The flux distribution in the charging area may no longer be even or symmetric, but the system can continue to operate and the remaining windings and converters can still transfer power and energy to the output. This can significantly increase the reliability and light-load efficiency of the WPT system.

The conductors in a slot may belong to the same winding or different windings. FIG. 11 shows a winding arrangement to achieve multiple turns in a winding in a structure with 12 slots. Each slot has two or more groups of conductors, and each group may have multiple turns from one winding. Each winding has a positive segment and a negative segment. In FIG. 11 each slot contains two groups, and in some slots the two groups of conductors may be from one winding, and in some other slots the two groups may be from two different windings. The groups may be put side by side, or one on top of the other in a slot. In FIG. 11, 3 windings (A, B, and C) are formed, winding A with A+ and A− as positive and negative segments, winding B with B+ and B− as positive and negative segments, and winding C with C+ and C− as positive and negative segments. One side of the leads, A+, B+, and C−, or A−, B−, and C−, may be connected together as a center point, or both ends of each winding may be brought out as connections to be coupled to power converters and resonant capacitors. Similar arrangements may be made to have more or fewer windings, and some windings may be put into series or parallel. In this way, the windings are arranged in similar techniques as in poly-phase ac electrical motors, and all winding and core technologies for such motors can be utilized to make coils for a WPT system. However, as each winding in a WPT system is coupled with a resonant capacitor and operates close to resonant mode, the winding current is naturally close to a sinusoidal waveform. In FIG. 11, each winding starts and ends with a partial slot, and a smooth rotating magnetic field with low space harmonics can be established in a space above the magnetic structure when sinusoidal currents with symmetrical phase shifts (phase displacement) are fed into the windings.

Although coplanar and symmetrical arrangements of windings are illustrated in the examples, the arrangement of windings and/or coils may not need to be coplanar nor symmetrical. The shape of a TX or RX magnetic structure may be arranged in any shapes, such as circular, rectangular, or irregular shapes.

Figure 13:
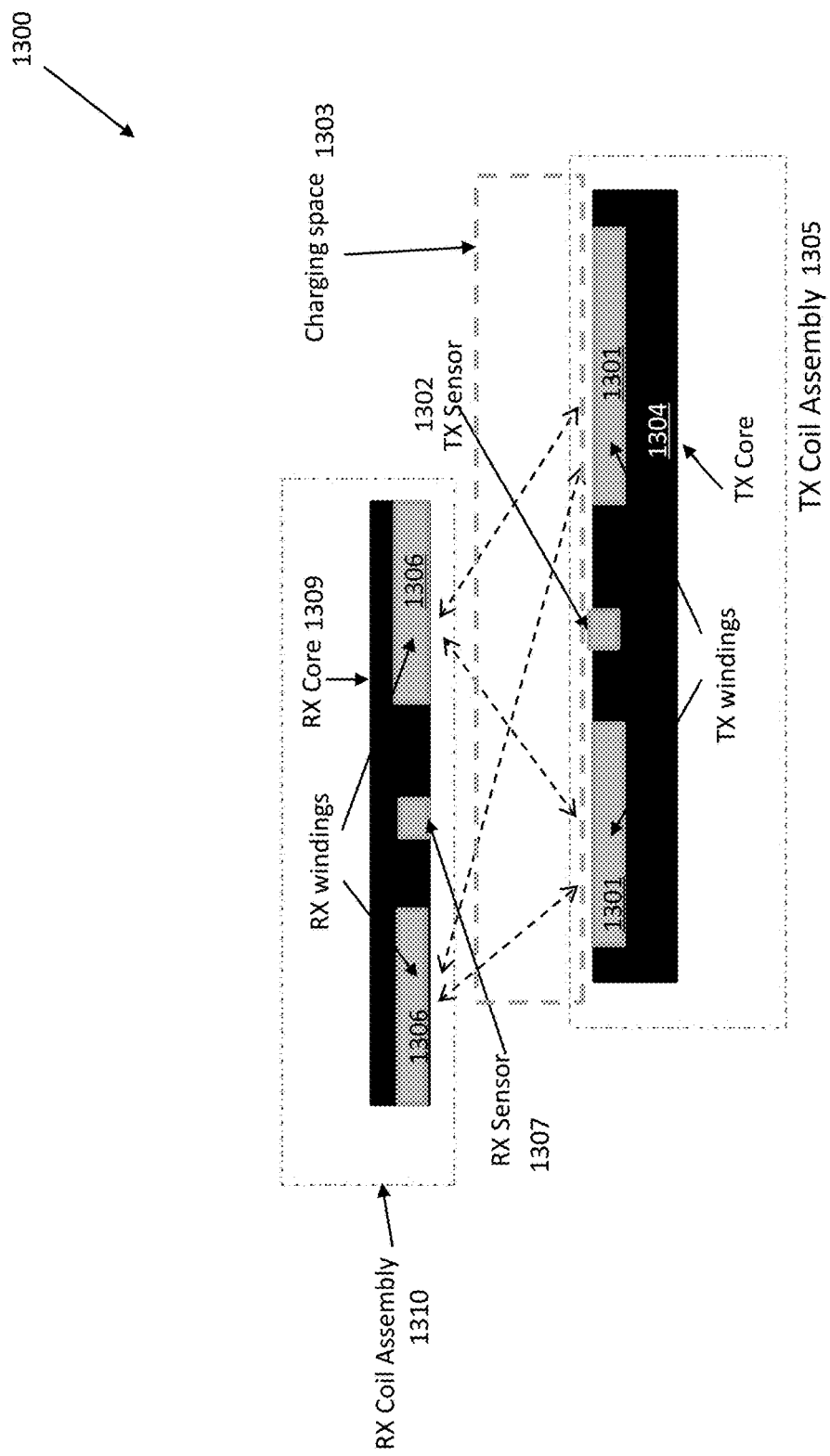
FIG. 13 illustrates a system with a WPT transmitter coil assembly and a WPT receiver coil assembly in accordance with various embodiments of the present disclosure.

FIG. 13 shows a system with a TX coil assembly and a RX coil assembly placed in proximity, and with the magnetic coupling between TX coils and RX coils established. A transmitter (TX) coil assembly 1305 may have multiple coils 1301 placed around a TX core 1304, which may include a connection core and a plurality of winding cores as discussed earlier. A receiver (RX) coil assembly 1310 may have multiple coils 1306 placed around a RX core 1309, which may include a connection core and a plurality of winding cores as discussed earlier. The number of transmitter coils may be different from the number of receiver coils. When a RX coil assembly (or RX) gets close to a TX coil assembly (or TX), each RX coil will be in magnetic coupling with each TX coil, but the strength of the coupling between a particular TX and a particular RX coils changes as the relative position of the RX and the TX changes. By measuring the relative strength of the magnetic coupling between different TX and RX coils, the relative position of RX and TX can be observed and sensed, and this information can be used to guide the RX or the TX into the best charging position if the RX or the TX is movable. Please note that the magnetic coupling strength may not need to be measured directly. For example, measuring a voltage signal across a winding or a circuit coupled to a winding may be a better option. When a TX senses a RX is getting into the charging area, it can send a current with a suitable magnitude and frequency to each transmitter coil sequentially, and the RX can measure a signal associated with a voltage or current in each RX coil which is related to and serve as an indicator of the magnetic strength in the RX core in the coil, to get an indication signal of the magnetic coupling coefficient or magnetic coupling strength through the received RX signal amplitude. In a system with N transmitter coils and K receiver coils, the coupling coefficient data can form a K×N or N×K matrix. By analyzing this coupling matrix, the relative position and angle of TX and RX can be obtained. Artificial intelligence (AI) and machine leaning algorithms can be used to incorporate large amount of simulation data and testing data, including historical data, in this process to get more accurate information.

As the wireless power transfer depends on magnetic induction, a metal object in the charging area can present dangers of over-heating and may interfere with the power transfer. Foreign-object detection may be used to protect a WPT system. A good way to do this is through using proper sensors. The sensor may be placed in the TX or RX. If a metal is in the charging area, the magnetic field in the area will cause significant inductance change or power loss and/or temperature change in the metal object. By sensing the temperature change or relative temperature in the charging area, potential danger and/or operational interference may be detected. A way is to use an arrayed infrared (IR) sensor with wide sensing angle to monitor the temperature of the charging area, and identify the location of metal object(s). AI and machine learning can be used to process the IR imaging data, incorporating testing, simulation and operation data in the process. Another way to detect a metal object in the charging area is to analyze the coupling matrix. Due to the symmetric arrangement of the coils in the RX and TX, irregularity in the elements of the coupling matrix may also indicate a metal subject in the corresponding area. When a metal object or potential danger is detected, the whole WPT system, or just the affected TX module(s), can be shut down for protection, or can work in a reduced power mode to avoid over-heating danger of the metal project. FIG. 13 shows that a sensor 1307 may be put in the center region of the RX, and/or a TX sensor 1302 may be put in the center region of the TX, where the flux density in the center region of a coil assembly can be arranged to be low so the sensors can operate reliably. Such sensors may be used for metal object sensing or other purposes. Of course, more than one sensors can be used in a TX or RX, or there may be no sensor in a TX or RX.

Figure 14A:
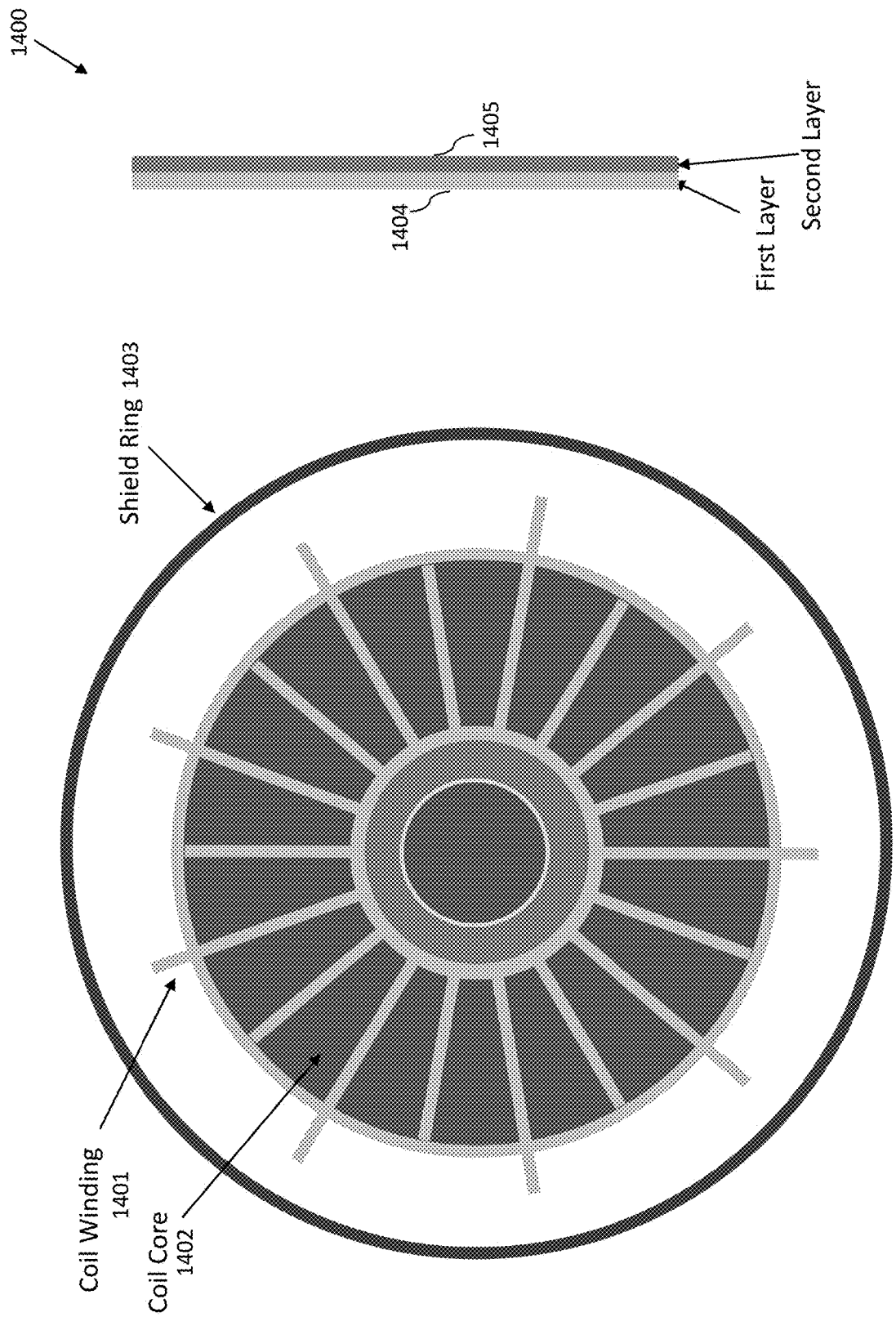
FIG. 14A illustrates a top view of a coil assembly with a shield ring in accordance with various embodiments of the present disclosure.
Figure 14B:
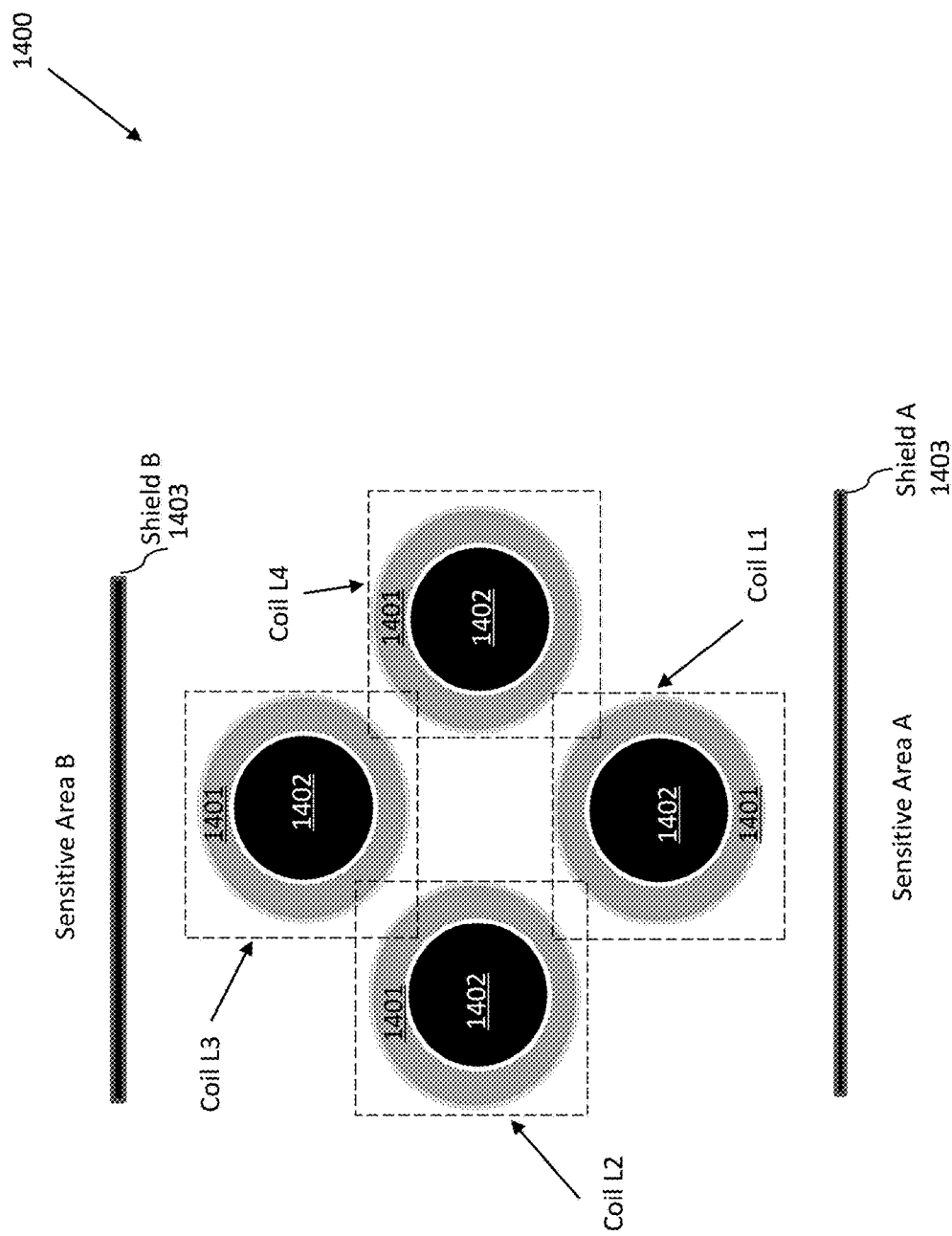
FIG. 14B illustrates a top view of a coil assembly with shields in accordance with various embodiments of the present disclosure.

A limiting factor in a WPT system is the stray magnetic field outside the charging area. With the modular design of resonators described above, the magnetic field tends to concentrate around the space adjacent to the RX and TX coils, and the strength of stray magnetic field outside such charging space can be much reduced. A magnetic shield can be employed to further reduce the stray magnetic field. FIGS. 14A and 14B (collectively FIG. 14) show examples of using magnetic shielding. In FIG. 14A, a cylinder shield 1403 may be placed around the RX and RX, and the cylinder may have multi layers (two layers shown as an example): one layer of magnetic material 1404 which has high magnetic permeability, and one layer of metallic material 1405 which has high electric conductivity. The shield may use also materials like silicon steel which can conduct both electrical current and magnetic flux. With such an enclosed shield, the stray magnetic field outside the charging area can be reduced significantly. However, a shield doesn't need to cover the whole charging area or form an enclosed shape. A shield may be placed to protect just sensitive areas as is shown in FIG. 14B. FIG. 14B shows an example with two localized shields 1403. A shield may be just a silicon steel or Aluminum sheet separating the charging area and a sensitive area, which may be a place where electronic equipment is located or human being may enter during a WPT system's operation.

In case some modules are shut down during low power operation, the selection of active modules may consider their effect on stray magnetic field in the sensitive area and maintain a more or less symmetric operation. For example, in FIG. 14B, if two modules are to be shut down (or de-activated), module 1 (associated with coil L1) and module 3 (associated with coil L3) may be shutdown, so Coil 2 and Coil 4 are still active. Coil L2 and coil L4 now may be controlled to conduct currents with opposite polarity based on the symmetrical principle, so the magnetic fields they generate tend to cancel each other out in the sensitive areas A and B, so the strength of stray magnetic field is much reduced in these areas.

Figure 15A:
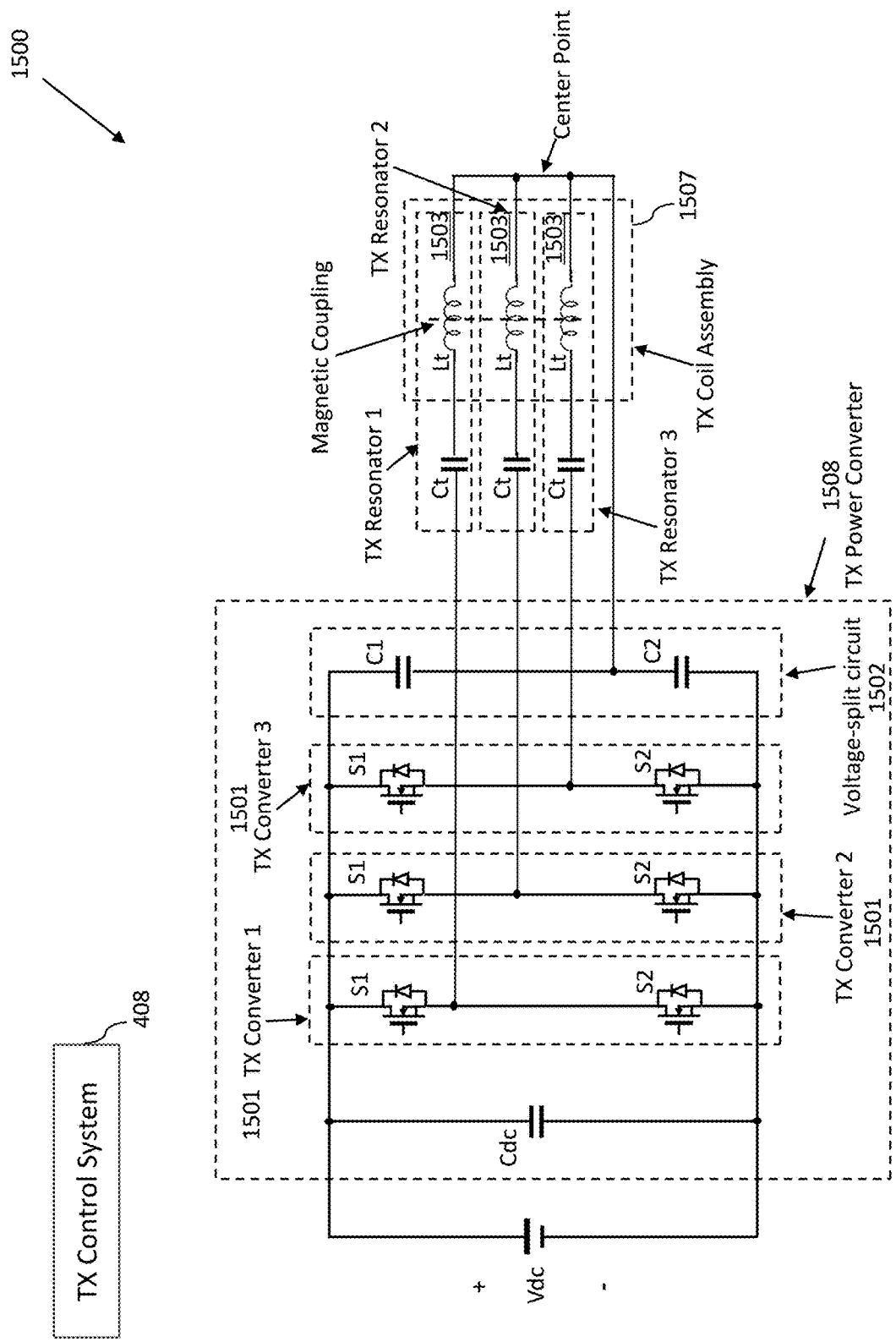
FIG. 15A illustrates a block diagram of a modular transmitter in accordance with various embodiments of the present disclosure.
Figure 15B:
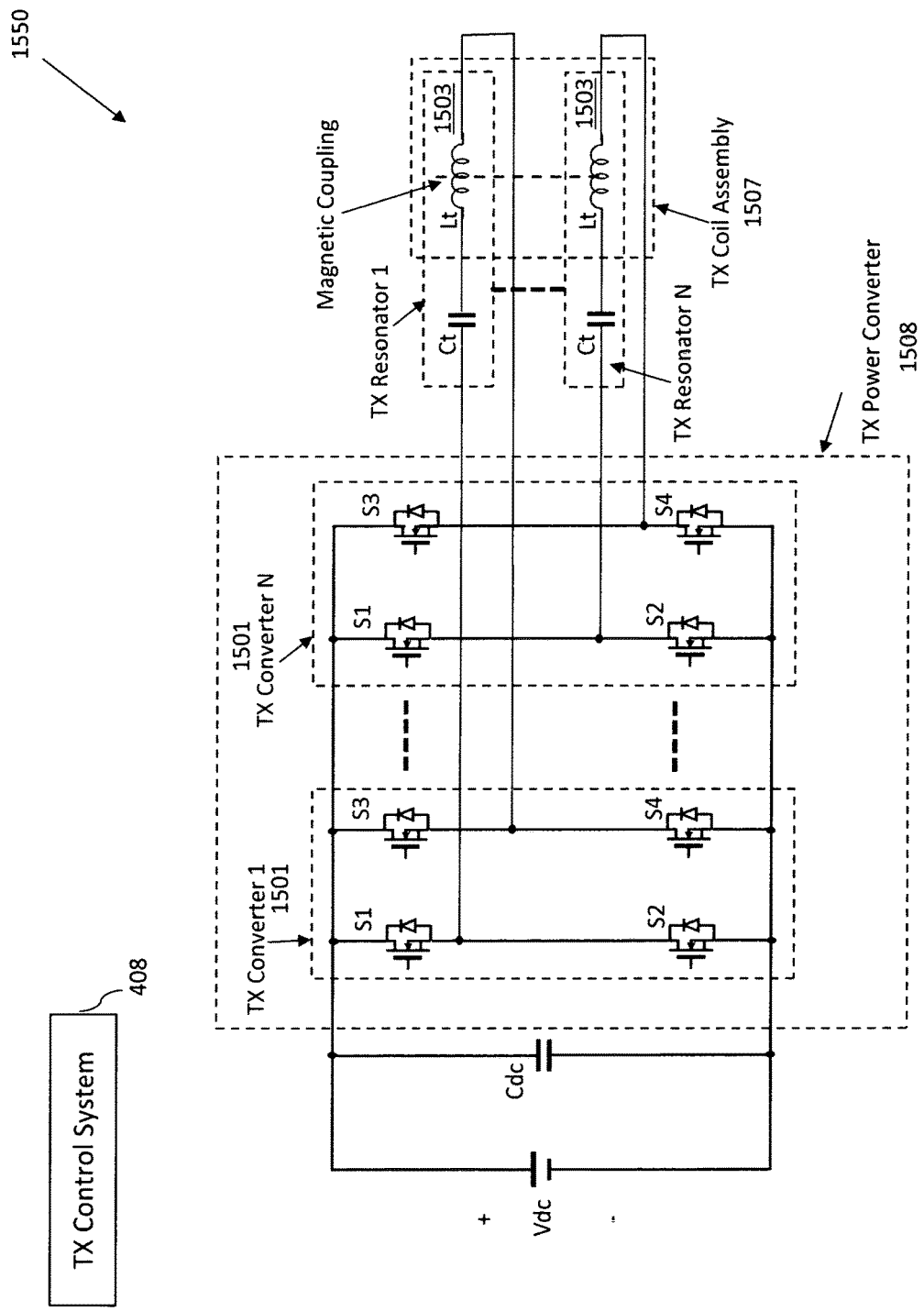
FIG. 15B illustrates a block diagram of another modular transmitter in accordance with various embodiments of the present disclosure.

Each coil may be coupled to a dedicated power converter (a TX converter or a RX rectifier) in a modular WPT system, as shown in FIGS. 2 and 3. However, multiple power converters may be integrated into a multi-phase converter, as will be demonstrated in FIGS. 15 and 16. FIGS. 15A and 15B (collectively FIG. 15) show two examples of implementing a multi-phase converter. In FIG. 15A, there are 3 resonators 1503, each consisting of a resonant capacitor Ct and a coil Lt, and 3 power converters 1501. Each power converter 1501 operates as a phase of the multi-phase converter 1508. A resonant capacitor can be implemented as a switchable or variable capacitor. The coils may be magnetically coupled together to form a coil assembly 1507, and one end of the associated windings may be coupled together (to a center point). If the windings are designed and arranged symmetrically and controlled symmetrically, the sum of all winding currents in a TX or RX should be zero or close to zero in steady state operation in average sense. The center point can be left floating, or be coupled to a point with stable voltage. In FIG. 15A, the center point is connected to a voltage-split circuit 1502 consisting of two capacitors C1 and C2 in series. One of C1 and C2 may be omitted without impacting the steady-state operation. The center point can also be connected to the negative or positive terminal of the dc voltage (Vo or Vdc) through an impedance circuit such as an inductor and/or a capacitor, and a switching network such as a half-bridge converter. The power converters may be all half-bridge converters. Of course, more converters, or converters in other topologies may also be used. FIG. 15B shows a system having N full-bridge power converters 1501 and N resonators 1503, each consisting of a resonant capacitor Ct and a coil Lt. The N coils may be magnetically coupled together to form a coil assembly 1507. Both ends of a resonator are connected a full-bridge converter. The transmitter 1500 in FIG. 15 is controlled by a transmitter control system 1504.

Figure 16:
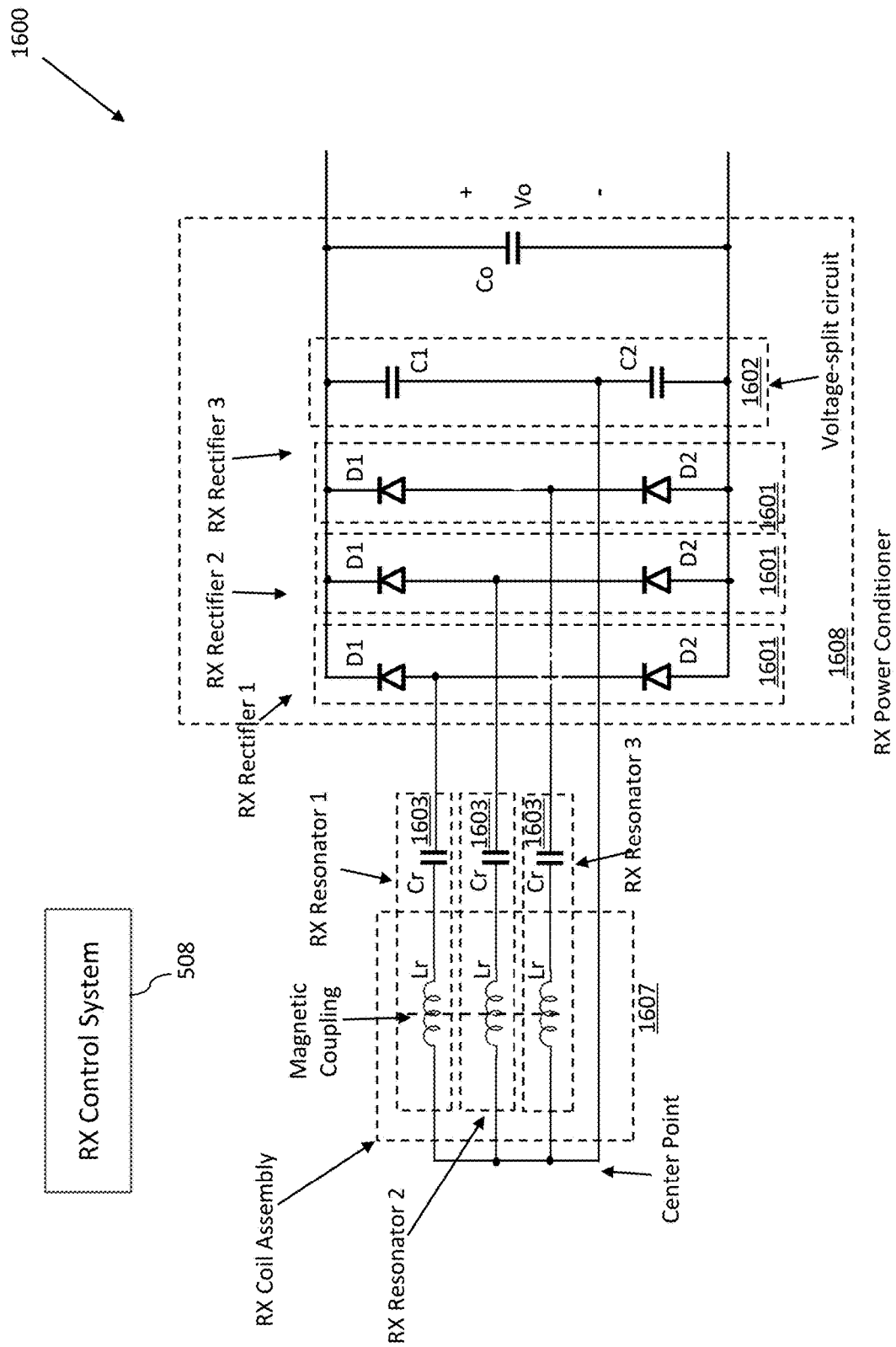
FIG. 16 illustrates a block diagram of a modular receiver in accordance with various embodiments of the present disclosure.

Multi-phase receivers can be implemented similarly as the multi-phase transmitter disclosed in FIG. 15. FIG. 16 show an example three-phase rectifier system with 3 receiver resonators 1603, three half-bridge rectifiers 1601, and a voltage split circuit 1602 consisting two capacitors C1 and C2. The voltage split circuit is an impedance circuit and may be replaced by other impedance circuits. Diodes are used in the rectifiers, but active switches such as IGBTs and MOSFETs can also be used as synchronous rectifiers as is well known in the industry. Each resonator consists of a resonant capacitor Cr and a coil Lr. The resonant capacitor may be implemented as a switchable or variable capacitor. The coils may be magnetically coupled together to form a coil assembly 1607, and one end of the associated windings may be coupled together (to a center point). If the windings of the coils are designed and arranged symmetrically and controlled symmetrically, the sum of all winding currents in the RX should be zero or close to zero in steady state operation in average sense. The center point can be left floating, or be coupled to a point with stable voltage. The center point can be coupled to a voltage-split circuit consisting of C1 and C2. In steady state operation, the center point is then at ½ of the dc link voltage Vdc. One of C1 and C2 may be omitted without impacting the steady-state operation. The center point can also be connected to the negative or positive terminal of the dc voltage (Vo or Vdc) through an impedance circuit such as an inductor and a switching network such as a half-bridge rectifier. The receiver 1600 is controlled by a RX control system 1604, which may include controlling the output voltage, power or current of the receiver by adjusting the capacitance of a resonant capacitor or each resonant capacitor.

By changing the capacitance of a resonant capacitor the current in a resonator may also be changed, which can be used to achieve current or thermal balance between the different resonators, coils, modules, power converters and/or rectifiers. By setting the capacitance of a resonant capacitor in the TX and/or RX resonator to its minimum value, a resonator may be also put into an idle mode.

As the magnetic field in the charging space are generated by multiple resonators collectively, the resonators and power converters may also be controlled collectively. In steady-state operation, the winding currents (coil currents) in a multi-coil TX system should be controlled with a symmetrical phase shift among the phases, and the current amplitude in each active transmitter coil may be controlled to be the same to form a balanced multi-phase system. Since the coils are distributed in space evenly with symmetric space angles, the current in each coil should have the same phase angle as space angle of the coil. This will result in a smoothly and evenly rotating magnetic field in the charging space. However, Due to the possible dis-alignment between the RX and the TX in a system, the TX resonant capacitor in the resonator of the RX and/or the TX may be configured to be different from that of another resonator to achieve such balance. The power switches in a transmitter may be switched at 50% duty cycle so soft switching (zero-voltage switching or zero current switching) of the switches can be achieved to reduce power losses and noise in the system. Alternatively, the power switches may be controlled in a phase-shift manner to achieve soft-switching operation. 50% duty cycle control and phase-shift control for multi-phase converters are well known in the industry. In transients, the duty cycle of switches may also be adjusted, and the top switch and bottom switch in a phase leg can be switched on and off in a complementary or symmetrical manner. The switching frequency and duty cycle of switches may be used for power control, and also be controlled to keep soft-switching of the power switches or to fulfil other system functions. For example, the duty cycle may be increased gradually in a start-up process to achieve soft start. Each of the resonant capacitors may be implemented as a switchable capacitor or variable capacitor. The resonant capacitance in a TX module may be adjusted for power control or for soft-switching of power switches in the module. The resonant capacitance adjustment in a RX module may be adjusted for power control or for soft-switching of power switches in the module. The capacitance adjustment of a resonant capacitor can also be used for fault protection, voltage limiting or circuit isolation, as a low capacitance means a high impedance to limit current through it. As the circuits for a receiver and a transmitter are symmetrical, the role of RX and TX in a system may be interchanged. For example, a receiver with synchronous rectifiers may be controlled to operate as a transmitter. This also allows a WPT system be bidirectional in power delivery. Again, most of the circuit can be shared with a wired charging system with similar methods as shown in FIGS. 4 through 6.

During light load, the number of active TX modules may be reduced to increase system efficiency. Symmetry may be kept during a reduced-module operation with the phase displacement between winding currents adjusted according to the actual number of modules. For example, a six-module system can be first reduced to a 3-module system, a two-module system and a 1-module system while still keeping a symmetrical configuration.

The spectrum available for wireless charging is limited by world-wide EMC regulations. Currently, several example frequency bands may be considered for WPT: 6.78 MHz, 100-148 kHz, 81-90 kHz, 60 kHz and 20 kHz. For a high power application, the control system may use more than one bands for power control to fully utilize the spectrum resources. Multi-band frequency control and capacitance switching can be combined in power control to provide a wide power range while keeping the switching frequency in the allowed WPT bands. Number of modules can also be used in power control. Usually, a system has both active power and reactive power. The active power is related to power delivered to the output, and controlling the active power can control the output power, output voltage or output current. The reactive power is related to the soft switching of power switches in the power converters. A good control strategy should consider both the active power control and reactive power control. In a resonant power conversion such as the resonators used in WPT systems, both reactive power and active power are dependent on the switching frequency, the inductance of the coil, and the capacitance of the resonant capacitance. So it is feasible to use any combination of these variables for active or reactive power control. Usually, it is difficult or expensive to control the inductance of a coil dynamically, and thus we will use the combination of frequency control and resonant capacitance switching as an example to explain the control of a WPT system. In such a system, a WPT system may have three independent control variables: the switching frequency, a TX resonant capacitance, and a RX resonant capacitance. Any of these variables can be used to control the active power or reactive power, and therefore there are freedom in setup the best control strategy for a particular application, in order to reach a system with the right active power to regulate the output to the desired voltage/current/power at the system output, while keeping the reactive power at the power converter output within a low and inductive range so the switches in the power converters can have soft switching (particularly zero voltage switching). For high power applications, in normal operation it may also be desirable to adjust the RX resonant capacitance so that the resonant frequency in the RX resonator is the same as or close to the switching frequency, in order to minimize the currents in TX coils to improve the efficiency of the system. An example control strategy may include:

1. For frequency bands with a wide range of frequencies (such as 100-148 kHz or 81-90 kHz), the switching frequency can be used as the main control parameter, and if needed resonant capacitance may be used as a secondary control parameter. When the switching frequency reaches the higher or lower limit of the band, a resonant capacitor can be switched to the next value to bring the frequency back to the range. When the highest capacitance or lowest capacitance is reached, then the switching frequency may be hopped to an adjacent band if needed.
2. For frequency bands with a narrow range (such as 6.78 MHz, 60 kHz or 20 kHz), resonant capacitance may be used as the main control parameter. When a switchable capacitor with predetermined capacitance values is used as a resonant capacitor, the resonator may be controlled to switch or jump between two adjacent values of the resonant capacitor regularly or irregularly, for example in a PWM manner where the relative time (duty cycle) of the resonator operating with a capacitance value may be used as a power control means or a hysteresis manner where whenever the output reaches a limit the capacitor is switched to the other capacitance value. When the capacitance of the resonant capacitor reaches to its limit, the switching frequency may be hopped to an adjacent band.
3. A TX may be controlled to regularly hop from one frequency band to another (or to a shutdown mode with zero output power) with a suitable frequency, usually in the range from a few hundreds to a few kilo Hz. The relative time (duty cycle) of a TX operating in a band may be used as a power control in this hopping mode. The advantage of this control compared to conventional burst control where the power switches may not be switched for some duration of time is that the power switches are always switching, so the system is capable of transferring some energy all the time, thus small devices such as sensors may be powered by the energy in the magnetic field.
4. The resonant capacitance in a TX module and the resonant capacitance in a RX module may be used simultaneously for power control, and the control in RX and TX may be coordinated through a communication system.
5. The duty cycle of the transmitter power converter may also be used as a control means under light load conditions. As the duty cycle control in a multi-phase converter may also achieve soft switching of the power switches with phase-shift control or complementary control of top and bottom switches in a phase leg, the power loss and noise level in the system may still be low, but the winding currents and thus the resulting in magnetic fields may have stronger contents at even-order harmonic frequencies. However, if the winding current is relatively low, the EMI effect of the even-order harmonic currents may still be manageable.

For example, a WPT system for an electric vehicle application may be designed to work within 81 kHz to 90 kHz range in normal operation. It may use the switching frequency Fsw as the main control parameter. For example, when the output power (voltage or current) is higher than its reference value, the Fsw is reduced to decrease the power output, and when the output power is lower than its reference value, the Fsw is increased to increase the output power. After the Fsw reaches the high limit FswH (90 kHz in this case), the resonant capacitance in TX or RX is switched to the next higher value, and Fsw and duty cycle of the power converters may be coordinated with the capacitance switching to achieve a smooth transition. After capacitance reaches the high limit, if the delivered power is still lower than the requirements, the number of active modules may be increased. If all modules are already in operation and the control system still asks for more power, the WPT system has reached its highest power capability in this frequency band, and cannot support higher power demand in this band. The system can either go to a higher frequency band or reduce the output power requirement to maintain a smooth system operation. After Fsw reaches the low frequency limit FswL (81 kHz in this case), the resonant capacitance in TX or RX may be switched to next lower value, and Fsw and duty cycle of the power converters may be coordinated with the capacitance switching to achieve a smooth transition. After the lowest capacitance is used, the number of active modules may be decreased. If the number of modules is reduced to its minimum and the output power is still higher than required, the WPT system has reached its lowest output power within this band, and should go to next lower frequency band, 60 kHz for example. Duty cycle and/or resonant capacitance can be changed during this band hopping process to limit the current and voltage stresses in the system to obtain a smooth transition. At 60 kHz band, the system cannot use switching frequency as the main control parameter. It can use the resonant capacitance, input voltage to the power converter or switch duty cycle as the main control parameter. The power converter may work in burst mode to reduce the output power further, or go to a lower frequency band, 20 kHz in this case, to reduce power. The number of modules can be used to manage power output and to reduce power losses during light load operation.

Figure 17:
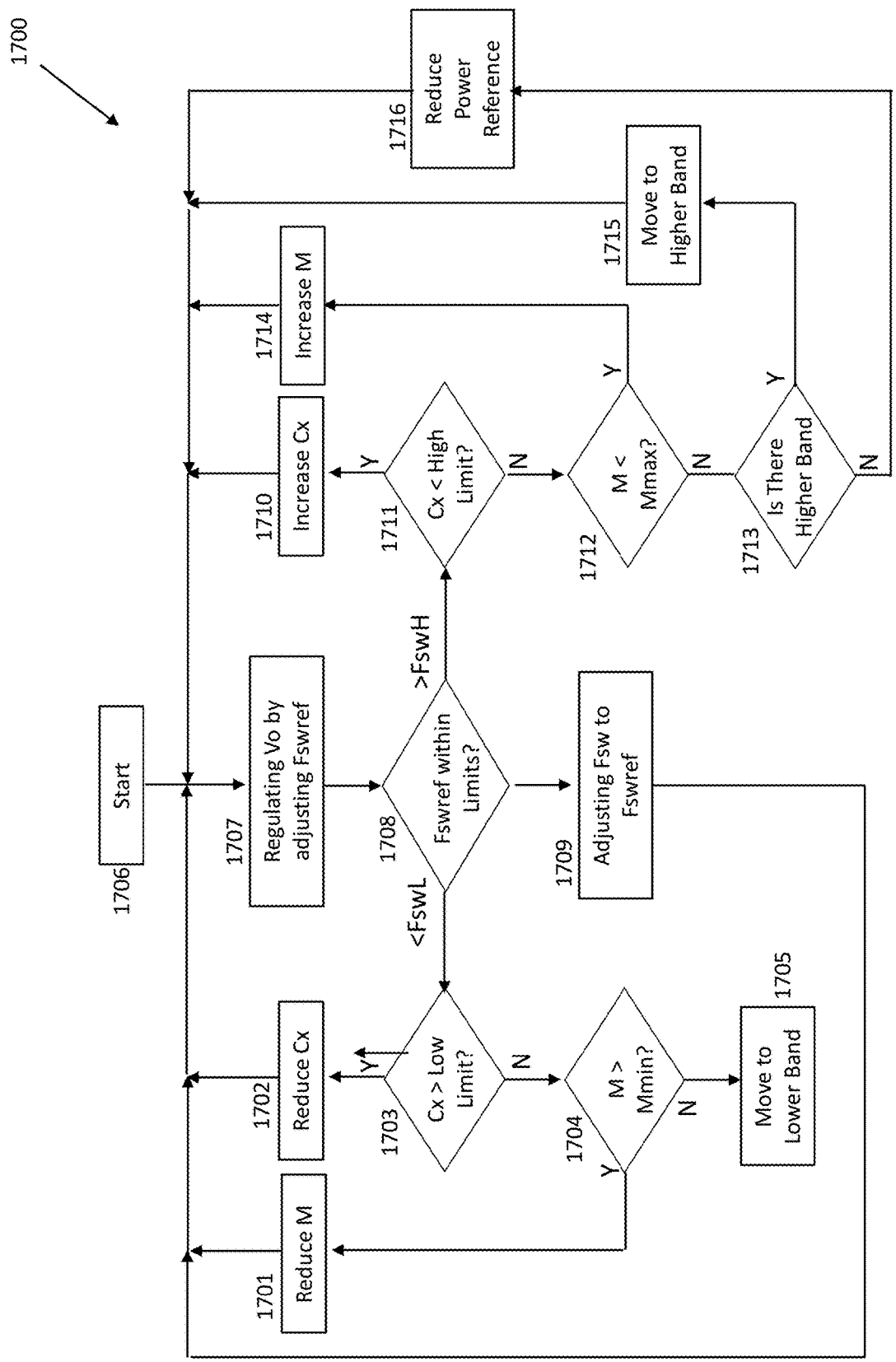
FIG. 17 illustrates a control block diagram of a WPT system in accordance with various embodiments of the present disclosure.
Figure 18:
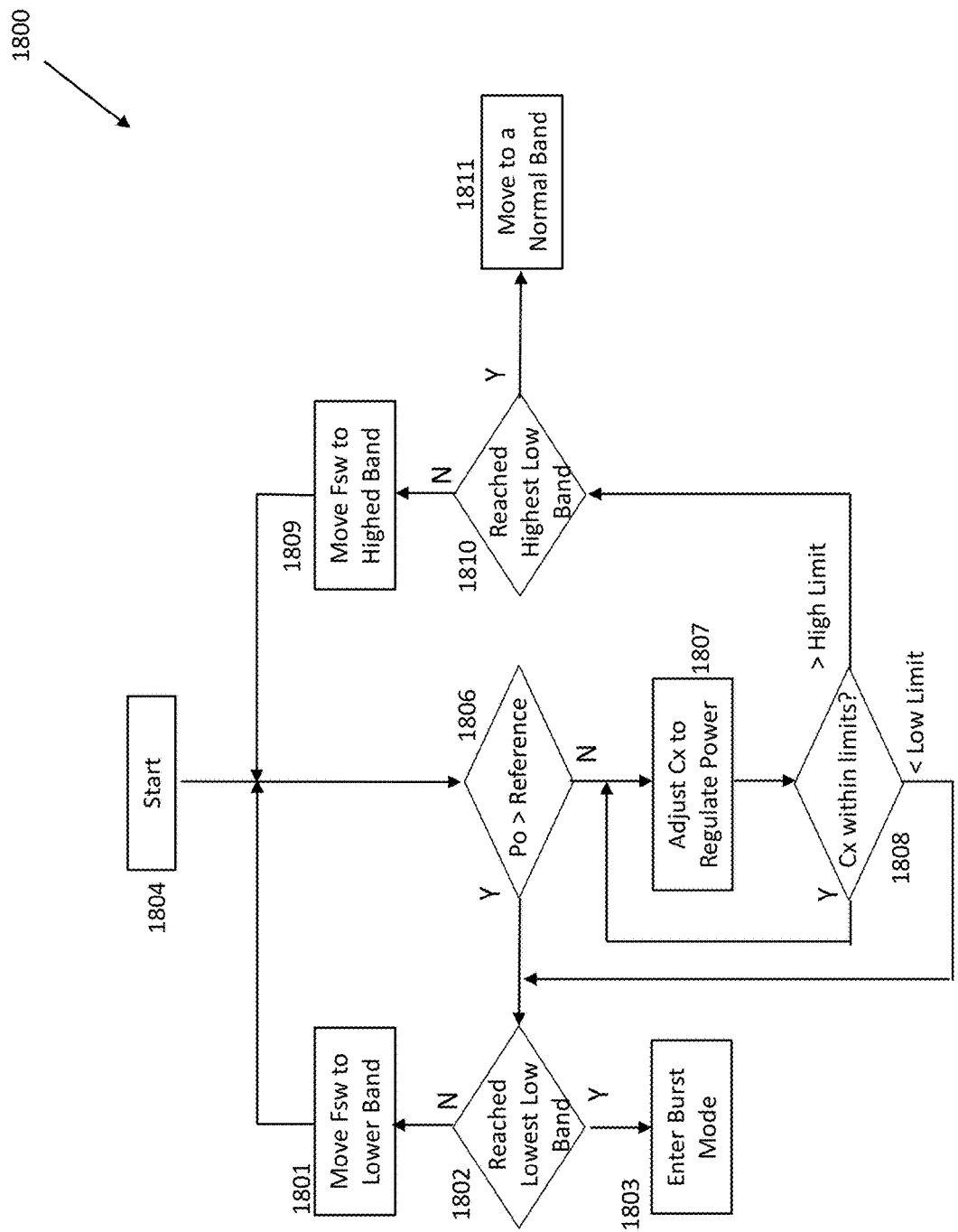
FIG. 18 illustrates another a control block diagram of a WPT system in accordance with various embodiments of the present disclosure.

FIG. 17 shows an example control flow chart in a wide frequency band, and FIG. 18 shows an example control flow chart in a narrow frequency band. These figures just show the basic logic, and many variants can be made in implementation.

The power control can be made at a module level, or at the system level to treat the system as a single multi-phase system, with a module as a phase. Please note that the number of phases in a TX may be different from that in a RX.

This disclosure has given examples to illustrate the invention. There may be different variants in implementation. For example, series resonant tanks are used in the figures as examples. Parallel resonant, series-parallel resonant, parallel-series resonant and multi-branch resonant can all be used, with frequency and capacitance control adjusted accordingly.

Although embodiments of the present invention and its advantages have been described in detail, it should be understood that various changes, substitutions and alterations can be made herein without departing from the spirit and scope of the invention as defined by the appended claims.

Although embodiments of the present invention and its advantages have been described regarding to mainly WPT systems, the technologies can be used in other power conversion systems such as power converters, power supplies, and wired charging equipment.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising:
a plurality of coils arranged approximately evenly along a perimeter at different space angles within the device, wherein each coil comprises a winding configured to be coupled to a power converter through a resonant capacitor, each coil forming a resonator with the resonant capacitor;
a connection core magnetically coupled to the plurality of coils; and
a plurality of power converters, wherein each power converter is coupled to one of the plurality of coils and configured such that a current flowing through the winding of each of the plurality of coils has approximately the same frequency as other winding currents of the plurality of coils, and the phase angle of the current is approximately equal to the space angle of the said coil, so a rotating magnetic field is formed in a space around the plurality of coils.

2. The device of claim 1, wherein the device is a transmitter or a receiver of a wireless power transfer system.

3. The device of claim 1, wherein the plurality of power converters forms a multi-phase power converter.

4. The device of claim 1, wherein the windings are placed close to the connection core and interleaved to further improve the magnetic coupling between the windings.

5. The device of claim 1, wherein a resonant capacitor is a switchable capacitor or a variable capacitor.

6. The device of claim 5, wherein the capacitance of the resonant capacitor is controlled to balance the currents in the windings.

7. The device of claim 5, wherein the capacitance of the resonant capacitor is adjusted in response to a voltage or a current of the device, or to protect the device.

8. The device of claim 1, wherein some coils are deactivated during a mode of operation, and wherein the phase angles of winding currents are adjusted according to the number of active coils.

9. The device of claim 1, wherein the switching frequency of the power converters is adjusted or hopped.

10. The device of claim 1, wherein the resonators are coupled to a wired charging connection block, and wherein the resonators and the wired charging block are configured to operate the device in either a wired charging mode or a wireless charging mode.

11. A system comprising:
a plurality of first coils arranged approximately evenly along a perimeter at different space angles within a first device, wherein each first coil comprises a first winding configured to be coupled to a power converter through a first resonant capacitor, each first coil forming a first resonator with the said first resonant capacitor, and wherein the plurality of first resonators comprises a first resonator block;
a first connection core magnetically coupled to the plurality of first coils;
a plurality of first power converters coupled to the first resonator, wherein each first power converter is coupled to one of the plurality of first coils and configured such that a current flowing through the first winding of each first coil has approximately the same frequency as other first winding currents in the first device, and the phase angle of the current is approximately equal to the space angle of the said first coil, so a rotating magnetic field is formed in a space around the first coils; and
a second resonator block comprising a plurality of second resonators in a second device, wherein each second resonator comprises a second resonant capacitor and a second coil having a second winding, and is magnetically coupled to the plurality of first resonators.

12. The system of claim 11, wherein the number of first coils is different from the number of second coils.

13. The system of claim 11, wherein the capacitance of a resonant capacitor in the first resonator block or the second resonator block is adjusted to deactivate the corresponding resonator block during a mode of operation.

14. The system of claim 11, wherein the capacitance of a resonant capacitor in the first resonator block or the second resonator block is adjusted in a PWM manner between two values.

15. The system of claim 11, wherein signals representative of currents or voltages in some of the first coils and second coils are used to determine the relative position of the first device and the second device.

16. A method comprising:
arranging a plurality of first coils approximately evenly along a perimeter at different space angles within a first device, wherein each first coil comprises a first winding configured to be coupled to a power converter through a first resonant capacitor, each first coil forming a first resonator with the said first resonant capacitor, and wherein the plurality of first resonators comprises a first resonator block;
magnetic coupling between first coils;
coupling a plurality of first power converters between an input port with an input voltage and the first resonator, wherein each first power converter is coupled to one of the plurality of first coils;
establishing a rotating magnetic field in a space among the first coils by configuring the first power converters such that the current flowing through the first winding of each first coil has the same frequency and its phase angle is approximately equal to the space angle of the said first coil; and
establishing a magnetic coupling between the first resonator and a second resonator block comprising a plurality of second resonators in a second device, wherein each second resonator comprises a second resonant capacitor and a second coil having a second winding, and is coupled to an output port having an output voltage and an output current.

17. The method of claim 16, further comprising controlling at least two variables selected from the switching frequency of the first power converters, the capacitance of one of the first resonant capacitors, and the capacitance of one of the second resonant capacitors to regulate the output voltage or the output current while maintaining a soft-switching of a first power switch in the first power converters.

18. The method of claim 16, wherein the number of active first coils is different from the number of active second coils in a mode of operation.

19. The method of claim 16, further comprising switching the capacitance of a resonant capacitor in one of the first resonators and second resonators between two predetermined values in a mode of operation.

20. The method of claim 16, further comprising sensing magnetic coupling strength signals between the first coils and the second coils, and using the magnetic coupling strength signals to detect a metal object in the space between the first coils and the second coils and to adjust the operation of the first resonator or the first power converter affected by the metal object.

* * * * *